(12) United States Patent
Hamazaki

(10) Patent No.: US 12,228,429 B2
(45) Date of Patent: Feb. 18, 2025

(54) RESOLVER-TO-DIGITAL CONVERTER CIRCUIT, RESOLVER SIGNAL PROCESSING APPARATUS, RESOLVER SIGNAL PROCESSING METHOD, AND PROGRAM

(71) Applicant: MABUCHI MOTOR CO., LTD., Matsudo (JP)

(72) Inventor: Kohei Hamazaki, Matsudo (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/696,334

(22) PCT Filed: Dec. 2, 2022

(86) PCT No.: PCT/JP2022/044505
§ 371 (c)(1),
(2) Date: Mar. 27, 2024

(87) PCT Pub. No.: WO2024/006399
PCT Pub. Date: Jun. 6, 2024

(65) Prior Publication Data
US 2024/0263969 A1 Aug. 8, 2024

(51) Int. Cl.
*G01D 5/20* (2006.01)
*G01B 7/30* (2006.01)

(52) U.S. Cl.
CPC .......... *G01D 5/20* (2013.01); *G01B 7/30* (2013.01)

(58) Field of Classification Search
CPC ................................... G01D 5/20; G01B 7/30
See application file for complete search history.

(56) References Cited

U.S. PATENT DOCUMENTS 4,579,122 A * 4/1986 Shimizu ............... G10K 11/355
73/620
4,604,575 A * 8/1986 Shimizu ............... G01B 7/30
318/653
(Continued)

FOREIGN PATENT DOCUMENTS

EP 2782259 A2 9/2014
JP 2007052001 A 3/2007
(Continued)

OTHER PUBLICATIONS

International Search Report in PCT Application No. PCT/JP2022/044505 mailed Mar. 7, 2023, 2pp.
(Continued)

*Primary Examiner* — Akm Zakaria
(74) *Attorney, Agent, or Firm* — HAUPTMAN HAM, LLP

(57) ABSTRACT

A resolver-to-digital converter circuit for performing signal processing on a resolver sensor including a SIN exciting coil, a COS exciting coil, and a detecting coil includes: a control device configured to generate excitation signals for the SIN and COS exciting coils; an excitation waveform generating unit configured to generate excitation waveforms for the SIN and COS exciting coils from the corresponding excitation signals; and a detecting unit configured to generate a signal indicating the angle of rotation of the resolver sensor based on a detection signal outputted from the detecting coil. The control device has: a waveform generating unit configured to perform $\Delta\Sigma$ modulation to generate PDM waveforms; a first waveform memory configured to store a PDM waveform corresponding to the excitation signal for the SIN exciting coil; and a second waveform memory configured to store a PDM waveform corresponding to the excitation signal for the COS exciting coil.

14 Claims, 16 Drawing Sheets

(56) References Cited

U.S. PATENT DOCUMENTS

| | | | |
|---|---|---|---|
| 2007/0029955 A1 | 2/2007 | Kanekawa et al. | |
| 2011/0090104 A1 | 4/2011 | Sata et al. | |
| 2013/0249452 A1* | 9/2013 | Shinohara | G01D 5/2073 |
| | | | 318/400.04 |
| 2015/0097709 A1 | 4/2015 | Courtney | |
| 2017/0268865 A1* | 9/2017 | Kimata | H02K 11/33 |
| 2017/0317682 A1* | 11/2017 | Shimizu | H02P 6/16 |
| 2020/0110582 A1* | 4/2020 | Katsu | G06F 7/57 |

FOREIGN PATENT DOCUMENTS

| | | | |
|---|---|---|---|
| JP | 2008216130 A | 9/2008 | |
| JP | 4344991 B2 | 10/2009 | |
| JP | 2010164450 A | 7/2010 | |
| JP | 2011089780 A | 5/2011 | |

OTHER PUBLICATIONS

Written Opinion in PCT Application No. PCT/JP2022/044505 mailed Mar. 7, 2023, 6pp.

* cited by examiner

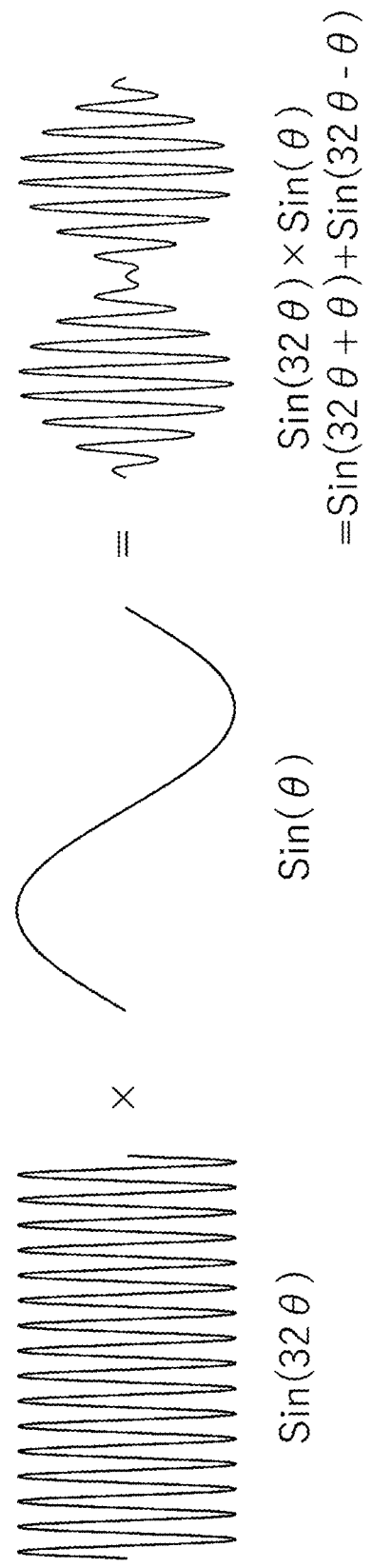

RESOLVER-TO-DIGITAL CONVERTER CIRCUIT, RESOLVER SIGNAL PROCESSING APPARATUS, RESOLVER SIGNAL PROCESSING METHOD, AND PROGRAM

The present application is a National Phase of International Application Number PCT/JP2022/044505 filed Dec. 2, 2022.

TECHNICAL FIELD

The present invention relates to a resolver-to-digital converter circuit, a resolver signal processing apparatus, a resolver signal processing method, and a program.

BACKGROUND ART

Patent Literature 1 describes a resolver signal processing apparatus that performs signal processing on a resolver including an exciting coil having first and second coils that are 900 out of phase, and a single-phase detecting coil. In paragraph 0023, there is a description to the effect that a pulse generator circuit outputs a pulse excitation signal obtained by performing pulse-width modulation (PWM) on a sine wave signal to apply the excitation signal to the exciting coil.

For example, FIG. 1 and FIG. 28 to 35 of Patent Literature 2 describe an exciting circuit that outputs an excitation signal to an exciting coil of a resolver, and a resolver-to-digital converter into which a signal that is outputted from a SIN detecting coil of the resolver and a signal that is outputted from a COS detecting coil of the resolver are inputted. In paragraph 0055, there is a description to the effect that a $\Delta\Sigma$ A/D converter is applied to a waveform generator circuit that generates an excitation waveform for the exciting coil. Moreover, in paragraph 0086 of Patent Literature 2, there is a description to the effect that a $\Delta\Sigma$ waveform generator circuit is applied to the resolver-to-digital converter into which the signals that are outputted from the detecting coils is inputted.

CITATION LIST

Patent Literature

Patent Literature 1: Japanese Patent No. 4344991
Patent Literature 2: JP-A-2007-52001

DISCLOSURE OF THE INVENTION

Problems to be Solved by the Invention

As described in detail below, in diligent study, the inventor confirmed that if an excitation signal generated by pulse-width modulation (PWM) is applied as in the technology described in Patent Literature 1, an excitation waveform that excites an exciting coil is distorted, which is difficult for a filter circuit to solve. It is found that the distortion can be reduced more in the excitation waveform that excites the exciting coil in a case where an excitation signal generated by pulse-density modulation (PDM) (specifically, $\Delta\Sigma$ modulation) is applied than in a case of use of pulse-width modulation (PWM); therefore, an error in the angle of rotation that is detected by a resolver sensor can be reduced.

Moreover, the inventor found in diligent study that a higher sampling frequency is required in a case where $\Delta\Sigma$ modulation is applied to a resolver such as described in Patent Literature 2 than in a case pulse-width modulation (PWM) is applied, however, a circuit configuration in which a PDM (pulse-density modulation) waveform that is generated by performing $\Delta\Sigma$ modulation is stored in memory enables even an inexpensive waveform generator circuit to easily achieve a high sampling frequency.

In other words, an object of the present invention is to provide a resolver-to-digital converter circuit, resolver signal processing apparatus, resolver signal processing method, and program that can reduce a distortion in an excitation waveform that excites an exciting coil and can reduce an error in the angle of rotation that is detected by a resolver sensor, and can cut the cost of a circuit configuration.

Solutions to the Problems

One aspect of the present invention is a resolver-to-digital converter circuit that performs signal processing on a resolver sensor including a SIN exciting coil, a COS exciting coil, and a detecting coil, the resolver-to-digital converter circuit including: a control device configured to generate an excitation signal for the SIN exciting coil and an excitation signal for the COS exciting coil; an excitation waveform generating unit configured to generate an excitation waveform for the SIN exciting coil from the excitation signal for the SIN exciting coil generated by the control device, and to generate an excitation waveform for the COS exciting coil from the excitation signal for the COS exciting coil generated by the control device; and a detecting unit configured to generate a signal indicating the angle of rotation of the resolver sensor on the basis of a detection signal outputted from the detecting coil, and the control device includes: a waveform generating unit configured to perform $\Delta\Sigma$ modulation to generate a PDM (pulse-density modulation) waveform corresponding to the excitation signal for the SIN exciting coil and a PDM waveform corresponding to the excitation signal for the COS exciting coil; a first waveform memory configured to store information for generating the PDM waveform corresponding to the excitation signal for the SIN exciting coil; and a second waveform memory configured to store information for generating the PDM waveform corresponding to the excitation signal for the COS exciting coil.

In the resolver-to-digital converter circuit of the one aspect of the present invention, the first waveform memory may store a modulated wave component and a carrier component as separate independent information, and the second waveform memory may store a modulated wave component and a carrier component as separate independent information.

In the resolver-to-digital converter circuit of the one aspect of the present invention, the control device may include a control logic configured to cause the waveform generating unit to execute a process of generating a PDM waveform, and the control logic may generate the excitation signal for the SIN exciting coil corresponding to the PDM waveform stored in the first waveform memory, and generate the excitation signal for the COS exciting coil corresponding to the PDM waveform stored in the second waveform memory.

In the resolver-to-digital converter circuit of the one aspect of the present invention, the waveform generating unit may include: a storage unit configured to store an amplitude modulated wave; an amplifier configured to amplify the amplitude modulated wave stored in the storage unit; and a $\Delta\Sigma$ modulation unit configured to perform $\Delta\Sigma$ modulation on the amplitude modulated wave amplified by the amplifier, and the amplifier may amplify the amplitude modulated wave in response to an instruction of the control logic on an amplitude value.

In the resolver-to-digital converter circuit of the one aspect of the present invention, the waveform generating unit may generate the PDM waveform corresponding to the excitation signal for the SIN exciting coil, and the PDM waveform corresponding to the excitation signal for the COS exciting coil individually, and the control logic may generate the excitation signal for the SIN exciting coil and the excitation signal for the COS exciting coil at a timing different from a timing when the waveform generating unit generates the PDM waveform corresponding to the excitation signal for the SIN exciting coil, or the PDM waveform corresponding to the excitation signal for the COS exciting coil.

In the resolver-to-digital converter circuit of the one aspect of the present invention, the control device may include a communication unit configured to receive the instruction on the amplitude value transmitted by the control logic to the amplifier, from outside of the control device.

In the resolver-to-digital converter circuit of the one aspect of the present invention, the ΔΣ modulation unit may include a ΔΣ modulator.

In the resolver-to-digital converter circuit of the one aspect of the present invention, the resolver sensor may include another SIN exciting coil, another COS exciting coil, and another detecting coil, the control device may generate an excitation signal for the other SIN exciting coil and an excitation signal for the other COS exciting coil, the resolver-to-digital converter circuit may include: another excitation waveform generating unit configured to generate an excitation waveform for the other SIN exciting coil from the excitation signal for the other SIN exciting coil generated by the control device, and to generate an excitation waveform for the other COS exciting coil from the excitation signal for the other COS exciting coil generated by the control device; and another detecting unit configured to generate a signal indicating the angle of rotation of the resolver sensor on the basis of a detection signal outputted from the other detecting coil, the waveform generating unit may perform ΔΣ modulation to generate a PDM waveform corresponding to the excitation signal for the other SIN exciting coil and a PDM waveform corresponding to the excitation signal for the other COS exciting coil, and the control device may include: a third waveform memory configured to store information for generating the PDM waveform corresponding to the excitation signal for the other SIN exciting coil; and a fourth waveform memory configured to store information for generating the PDM waveform corresponding to the excitation signal for the other COS exciting coil.

In the resolver-to-digital converter circuit of the one aspect of the present invention, a control logic configured to cause the waveform generating unit to execute a process of generating a PDM waveform may generate the excitation signal for the other SIN exciting coil corresponding to the PDM waveform stored in the third waveform memory, and generate the excitation signal for the other COS exciting coil corresponding to the PDM waveform stored in the fourth waveform memory.

In the resolver-to-digital converter circuit of the one aspect of the present invention, the waveform generating unit may generate the PDM waveform corresponding to the excitation signal for the SIN exciting coil, the PDM waveform corresponding to the excitation signal for the COS exciting coil, the PDM waveform corresponding to the excitation signal for the other SIN exciting coil, and the PDM waveform corresponding to the excitation signal for the other COS exciting coil individually, and the control logic may generate the excitation signal for the SIN exciting coil, the excitation signal for the COS exciting coil, the excitation signal for the other SIN exciting coil, and the excitation signal for the other COS exciting coil at a timing different from a timing when the waveform generating unit generates the PDM waveform corresponding to the excitation signal for the SIN exciting coil, the PDM waveform corresponding to the excitation signal for the COS exciting coil, the PDM waveform corresponding to the excitation signal for the other SIN exciting coil, or the PDM waveform corresponding to the excitation signal for the other COS exciting coil.

One aspect of the present invention is a resolver signal processing apparatus including: the resolver-to-digital converter circuit; and the resolver sensor including the SIN exciting coil, the COS exciting coil, and the detecting coil.

One aspect of the present invention is a resolver signal processing apparatus including: the resolver-to-digital converter circuit; and the resolver sensor including the SIN exciting coil, the COS exciting coil, the detecting coil, the other SIN exciting coil, the other COS exciting coil, and the other detecting coil.

One aspect of the present invention is a resolver signal processing method including an excitation signal generation step of causing a control device included in a resolver-to-digital converter circuit that performs signal processing on a resolver sensor including a SIN exciting coil, a COS exciting coil, and a detecting coil to generate an excitation signal for the SIN exciting coil and an excitation signal for the COS exciting coil, in which the resolver-to-digital converter circuit includes: an excitation waveform generating unit configured to generate an excitation waveform for the SIN exciting coil from the excitation signal for the SIN exciting coil generated by the control device, and to generate an excitation waveform for the COS exciting coil from the excitation signal for the COS exciting coil generated by the control device; and a detecting unit configured to generate a signal indicating the angle of rotation of the resolver sensor on the basis of a detection signal outputted from the detecting coil, and the resolver signal processing method further includes: a waveform generation step of causing the control device to perform ΔΣ modulation to generate a PDM waveform corresponding to the excitation signal for the SIN exciting coil and a PDM waveform corresponding to the excitation signal for the COS exciting coil; a first waveform storage step of causing the control device to store information for generating the PDM waveform corresponding to the excitation signal for the SIN exciting coil generated in the waveform generation step; and a second waveform storage step of causing the control device to store information for generating the PDM waveform corresponding to the excitation signal for the COS exciting coil generated in the waveform generation step.

One aspect of the present invention is a program for causing a computer configuring a control device included in a resolver-to-digital converter circuit that performs signal processing on a resolver sensor including a SIN exciting coil, a COS exciting coil, and a detecting coil to execute an excitation signal generation step of generating an excitation signal for the SIN exciting coil and an excitation signal for the COS exciting coil, in which the resolver-to-digital converter circuit includes: an excitation waveform generating unit configured to generate an excitation waveform for the SIN exciting coil from the excitation signal for the SIN exciting coil generated by the control device, and to generate an excitation waveform for the COS exciting coil from the excitation signal for the COS exciting coil generated by the control device; and a detecting unit configured to generate a signal indicating the angle of rotation of the resolver sensor on the basis of a detection signal outputted from the detecting coil, and the program further causes the computer to execute: a waveform generation step of performing $\Delta\Sigma$ modulation to generate a PDM waveform corresponding to the excitation signal for the SIN exciting coil and a PDM waveform corresponding to the excitation signal for the COS exciting coil; a first waveform storage step of storing information for generating the PDM waveform corresponding to the excitation signal for the SIN exciting coil generated in the waveform generation step; and a second waveform storage step of storing information for generating the PDM waveform corresponding to the excitation signal for the COS exciting coil generated in the waveform generation step.

Effects of the Invention

According to the present invention, it is possible to provide a resolver-to-digital converter circuit, resolver signal processing apparatus, resolver signal processing method, and program that can reduce a distortion in an excitation waveform that excites an exciting coil and can reduce an error in the angle of rotation that is detected by a resolver sensor, and can cut the cost of a circuit configuration.

BRIEF DESCRIPTION OF THE DRAWINGS

FIG. 6 is a diagram for explaining a Sin table for generating a PDM waveform according to the first embodiment.

DESCRIPTION OF PREFERRED EMBODIMENTS

Embodiments of a resolver-to-digital converter circuit, a resolver signal processing apparatus, a resolver signal processing method, and a program of the present invention are described hereinafter with reference to the accompanying drawings.

First Embodiment

Figure 1:
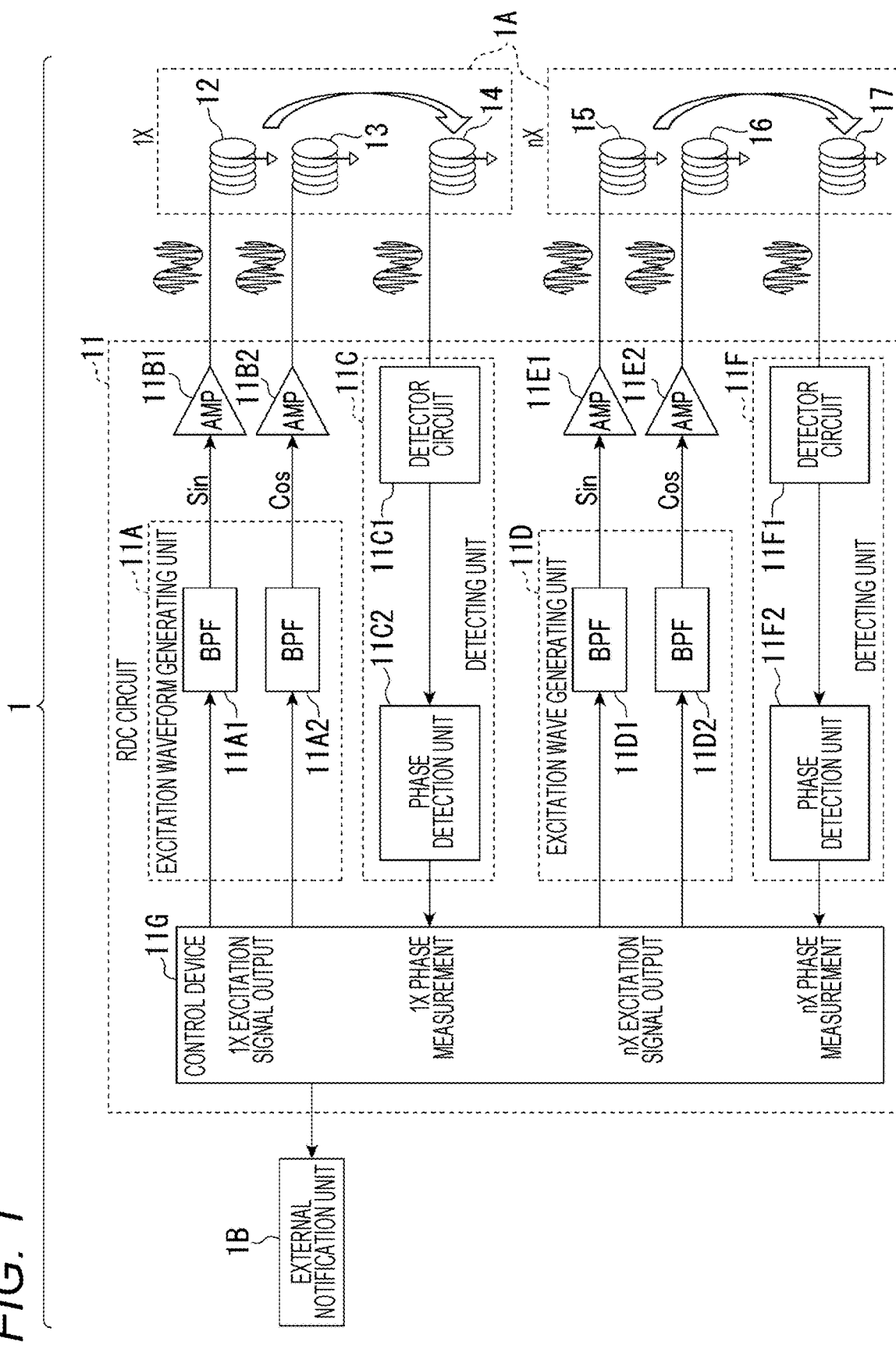
FIG. 1 is a diagram illustrating an example of a resolver signal processing apparatus 1 of a first embodiment.

FIG. 1 is a diagram illustrating an example of a resolver signal processing apparatus 1 of a first embodiment.

In the example illustrated in FIG. 1, the resolver signal processing apparatus 1 includes a resolver-to-digital converter circuit (RDC circuit) 11, a resolver sensor 1A, and an external communication unit 1B.

The resolver sensor 1A is, for example, a sheet coil-type resolver having a multiplication factor of angle of nX such as described in WO 2022/124413 A. The resolver sensor 1A includes a SIN exciting coil 12 for 1X, a COS exciting coil 13 for 1X, and a detecting coil 14 for 1X. Moreover, the resolver sensor 1A includes a SIN exciting coil 15 for nX, a COS exciting coil 16 for nX, and a detecting coil 17 for nX. The detecting coils 12 to 14 for 1X and the detecting coils 15 to 17 for nX detect the rotational position of the same shaft, and coaxially placed.

The resolver-to-digital converter circuit 11 performs signal processing on a signal that is inputted into the resolver sensor 1A and a signal that is outputted from the resolver sensor 1A. The external communication unit 1B is, for example, a user interface with another apparatus (such as a motor control apparatus) that is connected with the resolver signal processing apparatus 1.

In the example illustrated in FIG. 1, the resolver signal processing apparatus 1 includes the external communication unit 1B. However, in another example, the resolver signal processing apparatus 1 may not include the external communication unit 1B. In other words, a function corresponding to the external communication unit 1B may be provided separately from the resolver signal processing apparatus 1.

In the example illustrated in FIG. 1, the resolver-to-digital converter circuit 11 includes an excitation waveform generating unit 11A, amplifiers 11B1 and 11B2, a detecting unit 11C, an excitation waveform generating unit 11D, amplifiers 11E1 and 11E2, a detecting unit 11F, and a control device 11G.

In the example illustrated in FIG. 1, the control device 11G includes an FPGA (Field Programmable Gate Array). However, in another example, the control device 11G may include a component other than an FPGA (for example, an LSI (Large Scale Integration) such as a DSP (Digital Signal Processor), a PLD (Programmable Logic Device), or an AS11C (Application Specific Integrated Circuit)).

Figure 3:
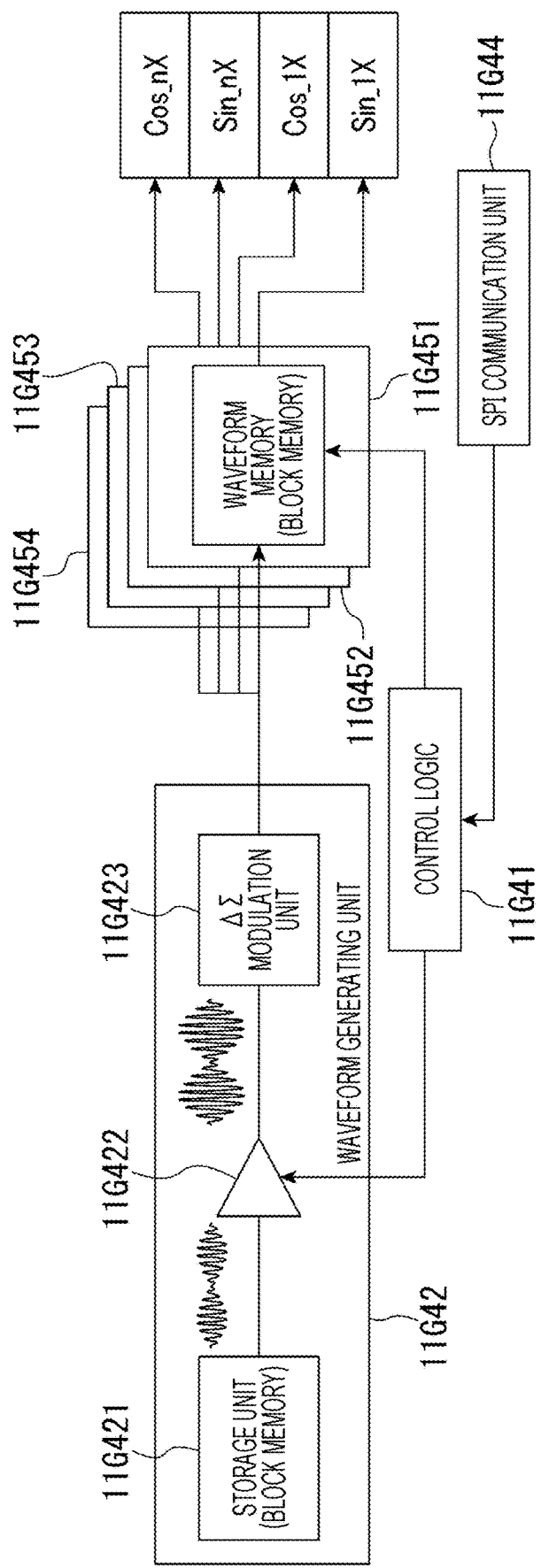
FIG. 3 is a diagram illustrating an example of relationships between a control logic 11G41, a waveform generating unit 11G42, an SPI communication unit 11G44, and waveform memories 11G451, 11G452, 11G453, and 11G454 of the control device 11G of the resolver signal processing apparatus 1 of the first embodiment.

In the example illustrated in FIG. 1, the control device 11G generates an excitation signal Sin_1X for the SIN exciting coil 12 (refer to FIG. 3), and an excitation signal Cos_1X for the COS exciting coil 13 (refer to FIG. 3). The excitation signal Sin_1X and the excitation signal Cos_1X are digital signals for generating analog signals to be outputted to the SIN exciting coil 12 and the COS exciting coil 13, respectively.

The excitation waveform generating unit 11A distorts the digital signal outputted from the control device 11G to generate an analog signal. The excitation waveform generating unit 11A includes a band-pass filter 11A1 and a band-pass filter 11A2. The band-pass filter 11A1 generates an excitation waveform Sin for the SIN exciting coil 12 from the excitation signal Sin_1X for the SIN exciting coil 12 generated by the control device 11G. The band-pass filter 11A2 generates an excitation waveform Cos for the COS exciting coil 13 from the excitation signal Cos_1X for the COS exciting coil 13 generated by the control device 11G.

The amplifier 11B1 amplifies the excitation waveform Sin for the SIN exciting coil 12 generated by the band-pass filter 11A1 to supply the excitation waveform Sin for the SIN exciting coil 12 to the SIN exciting coil 12. The amplifier 11B2 amplifies the excitation waveform Cos for the COS exciting coil 13 generated by the band-pass filter 11A2 to supply the excitation waveform Cos for the COS exciting coil 13 to the COS exciting coil 13.

The detecting unit 11C includes a detector circuit 11C1, and a phase detection unit 11C2. The detector circuit 11C1 demodulates a detection signal (modulated wave) outputted from the detecting coil 14. Note that the synchronous detection technique may be used as a specific demodulation technique. The detector circuit 11C1 performs a process of taking a signal indicating the angle of rotation of the resolver sensor 1A out of the modulated wave outputted from the detecting coil 14 by performing synchronous detection. The phase detection unit 11C2 detects the phase of rotation indicating the angle of rotation of the resolver sensor 1A from the signal taken out by the detector circuit 11C1. In other words, the detecting unit 11C generates a signal indicating the angle of rotation of the resolver sensor 1A on the basis of the detection signal outputted from the detecting coil 14.

Moreover, in the illustrated example, the detecting coils 12 to 14 for 1X and the detecting coils 15 to 17 for nX are included. Therefore, the resolver-to-digital converter circuit 11 includes a circuit similar to the above-mentioned circuit for 1X, as a circuit for nX. FIG. 1 illustrates a case in which the excitation waveform generating unit 11D, the amplifier 11E1, the amplifier 11E2, and the detecting unit 11F are included as the circuit for nX. Note that the configurations of the excitation waveform generating unit 11D, the amplifier 11E1, the amplifier 11E2, and the detecting unit 11F are similar to those of the excitation waveform generating unit 11A, the amplifier 11B1, the amplifier 11B2, and the detecting unit 11C. Therefore, descriptions thereof are omitted.

Figure 2:
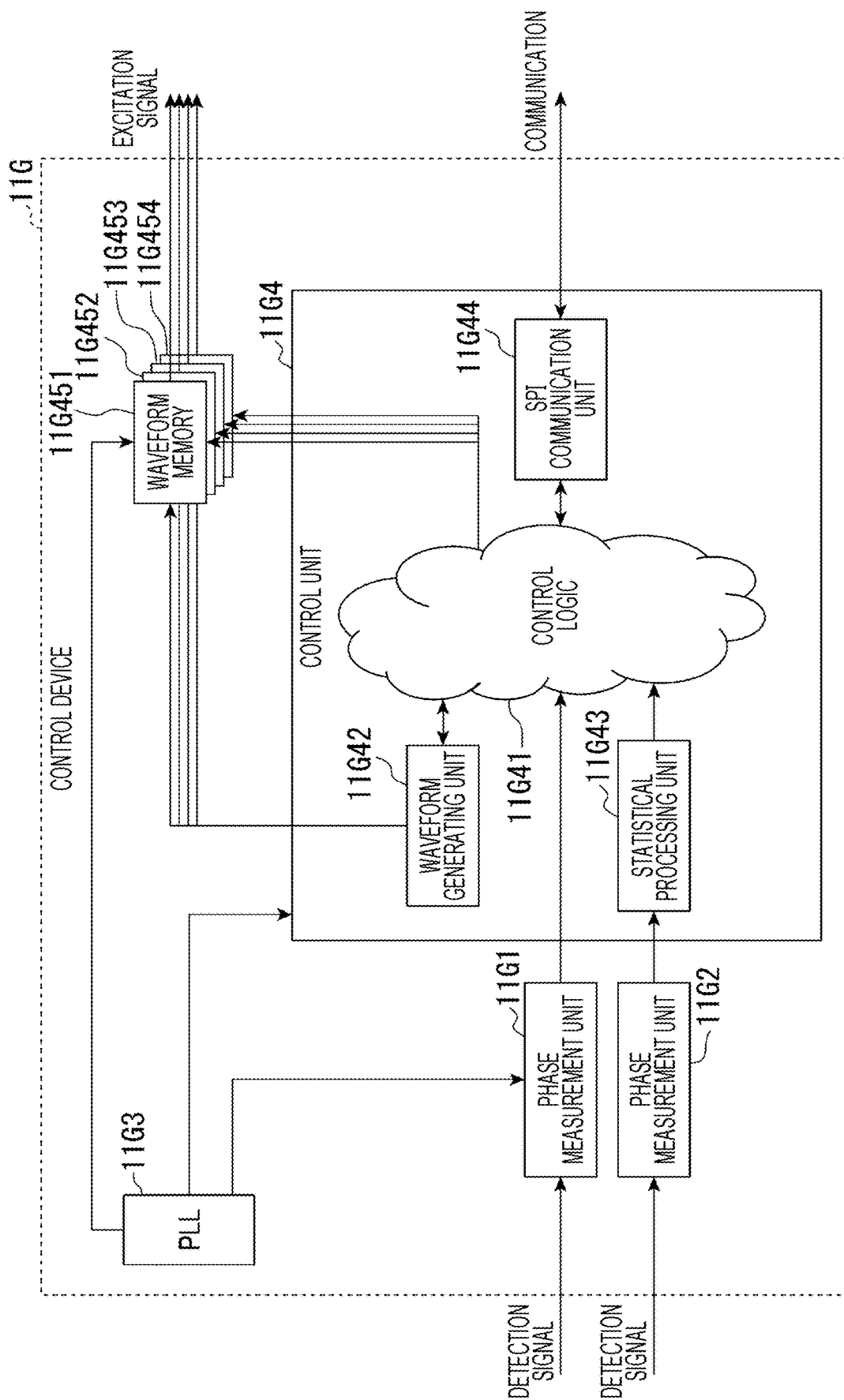
FIG. 2 is a diagram illustrating an example of the configuration of a control device 11G of the resolver signal processing apparatus 1 of the first embodiment.

FIG. 2 is a diagram illustrating an example of the configuration of the control device 11G of the resolver signal processing apparatus 1 of the first embodiment.

In the example illustrated in FIG. 2, the control device 11G includes phase measurement units 11G1 and 11G2, a PLL (phase-locked loop) 11G3, a control unit 11G4, and waveform memories 11G451, 11G452, 11G453, and 11G454.

The phase measurement unit 11G1 measures the angle of rotation of the resolver sensor 1A on the basis of a signal outputted from the phase detection unit 11C2 of the detecting unit 11C. The phase measurement unit 11G2 measures the angle of rotation of the resolver sensor 1A on the basis of a signal outputted from a phase detection unit 11F2 of the detecting unit 11. The PLL 11G3 outputs clocks to the phase measurement unit 11G1, the control unit 11G4, and the waveform memories 11G451, 11G452, 11G453, and 11G454.

In the example illustrated in FIG. 2, the PLL 11G3 outputs a clock of 200 MHz to the phase measurement unit 11G1, outputs a clock of 20 MHz to the control unit 11G4, and outputs a clock of 100 MHz to the waveform memories 11G451, 11G452, 11G453, and 11G454. In another example, the frequencies of the clocks outputted by the PLL 11G3 to the phase measurement unit 11G1, the control unit 11G4, and the waveform memories 11G451, 11G452, 11G453, and 11G454 may be different from the example illustrated in FIG. 2.

In the example illustrated in FIG. 2, the control unit 11G4 includes a control logic 11G41, a waveform generating unit 11G42, a statistical processing unit 11G43, and an SPI (Serial Peripheral Interface) communication unit 11G44. The control logic 11G41 causes the waveform generating unit 11G42 to execute a process of generating a PDM waveform. The waveform generating unit 11G42 performs $\Delta\Sigma$ modulation to generate a PDM waveform corresponding to the excitation signal Sin_1X for the SIN exciting coil 12 (refer to FIG. 3), a PDM waveform corresponding to the excitation signal Cos_1X for the COS exciting coil 13 (refer to FIG. 3), a PDM waveform corresponding to the excitation signal Sin_nX for the SIN exciting coil 15 (refer to FIG. 3), and a PDM waveform corresponding to the excitation signal Cos_nX for the COS exciting coil 16 (refer to FIG. 3).

The statistical processing unit 11G43 performs statistical processing on the angle of rotation of the resolver sensor 1A that is measured by the phase measurement unit 11G2 (for example, performs a process of quantifying a plurality of values, or the like). The SPI communication unit 11G44 is, for example, a communication port, and communicates with the external communication unit 1B. The communication method is not limited to SPI communication. Serial communication such as RS485 and I2C and other communication methods may be used. The SPI communication unit may be simply described as the communication unit.

The waveform memory 11G451 stores information for generating the PDM waveform corresponding to the excitation signal Sin_1X for the SIN exciting coil 12. The waveform memory 11G451 may store a modulated wave component and a carrier component as separate independent information. The waveform memory 11G452 stores information for generating the PDM waveform corresponding to the excitation signal Cos_1X for the COS exciting coil 13.

The waveform memory 11G452 may store information including a modulated wave component and a carrier component as separate independent information. The waveform memory 11G453 stores information for generating the PDM waveform corresponding to the excitation signal Sin_nX for the SIN exciting coil 15. The waveform memory 11G453 may store information including a modulated wave component and a carrier component as separate independent information. The waveform memory 11G454 stores information for generating the PDM waveform corresponding to the excitation signal Cos_nX for the COS exciting coil 16. The waveform memory 11G454 may store information including a modulated wave component and a carrier component as separate independent information.

In the example illustrated in FIG. 2, the control logic 11G41 causes the waveform generating unit 11G42 to execute a process of generating the PDM waveform corresponding to the excitation signal Sin_1X for the SIN exciting coil 12. The waveform memory 11G451 stores the information for generating the PDM waveform corresponding to the excitation signal Sin_1X for the SIN exciting coil 12 generated by the waveform generating unit 11G42.

Furthermore, the control logic 11G41 generates the excitation signal Sin_1X for the SIN exciting coil 12 corresponding to the information for generating the PDM waveform stored in the waveform memory 11G451.

The control logic 11G41 causes the waveform generating unit 11G42 to execute a process of generating the PDM waveform corresponding to the excitation signal Cos_1X for the COS exciting coil 13. The waveform memory 11G452 stores the information for generating the PDM waveform corresponding to the excitation signal Cos_1X for the COS exciting coil 13 generated by the waveform generating unit 11G42.

Furthermore, the control logic 11G41 generates the excitation signal Cos_1X for the COS exciting coil 13 corresponding to the information for generating the PDM waveform stored in the waveform memory 11G452.

Note that the excitation signal Sin_nX for the SIN exciting coil 15 is also generated similarly to the excitation signal Sin_1X for the SIN exciting coil 12, and the excitation signal Cos_nX for the COS exciting coil 16 is also generated similarly to the excitation signal Cos_1X for the COS exciting coil 13. Therefore, descriptions of the excitation signal Sin_nX and the excitation signal Cos_nX are omitted.

FIG. 3 is a diagram illustrating an example of relationships between the control logic 11G41, the waveform generating unit 11G42, the SPI communication unit 11G44, and the waveform memories 11G451, 11G452, 11G453, and 11G454 of the control device 11G of the resolver signal processing apparatus 1 of the first embodiment.

In the example illustrated in FIG. 3, the waveform generating unit 11G42 includes a storage unit 11G421, an amplifier 11G422, and a ΔΣ modulation unit 11G423.

The storage unit 11G421 stores an amplitude modulated wave (refer to FIG. 3). The storage unit 11G421 may store information including a modulated wave component and a carrier component as separate independent information, as information for generating an amplitude modulated wave. The storage unit 11G421 may be included in the waveform memory 11G451.

The amplifier 11G422 amplifies the amplitude modulated wave stored in the storage unit 11G421. In other words, the amplifier 11G422 amplifies an amplitude modulated wave illustrated on the left of the amplifier 11G422 of FIG. 3 and generates an amplitude modulated wave illustrated on the right of the amplifier 11G422 of FIG. 3. Specifically, the amplifier 11G422 amplifies an amplitude modulated wave in response to an instruction of the control logic 11G41 on an amplification value. More specifically, the control logic 11G41 causes the amplifier 11G422 to execute a process of amplifying an amplitude modulated wave in response to an instruction of the SPI communication unit 11G44. The SPI communication unit 11G44 receives the instruction on the amplification value from the external communication unit 1B outside of the control device 11G.

The ΔΣ modulation unit 11G423 performs ΔΣ modulation on the amplitude modulated wave amplified by the amplifier 11G422.

Examples of the information for generating an amplitude modulated wave to be stored in the storage unit 11G421 include a sine wave table. The waveform generating unit 11G42 performs a multiplication by use of one table datum to save the amount of data used and therefore generates a modulated waveform. In other words, in the example illustrated in FIG. 3, a modulated wave is generated as the amplitude modulated wave stored in the storage unit 11G421 from the sine wave table to reduce the number of elements of an electronic component. The details of generation of a modulated wave are described below. Moreover, in the waveform generating unit 11G42, the amplifier 11G422 adjusts the amplitude with an analog waveform as an original waveform. Moreover, the maximum value of an intermediate calculated value of ΔΣ modulation is held down to 10 bits.

Moreover, in the example illustrated in FIG. 3, the waveform generating unit 11G42 generates the PDM waveform corresponding to the excitation signal Sin_1X for the SIN exciting coil 12, the PDM waveform corresponding to the excitation signal Cos_1X for the COS exciting coil 13, the PDM waveform corresponding to the excitation signal Sin_nX for the SIN exciting coil 15, and the PDM waveform corresponding to the excitation signal Cos_nX for the COS exciting coil 16 individually.

The control logic 11G41 generates the excitation signal Sin_1X for the SIN exciting coil 12, the excitation signal Cos_1X for the COS exciting coil 13, the excitation signal Sin_nX for the SIN exciting coil 15, and the excitation signal Cos_nX for the COS exciting coil 16 at a timing different from a timing when the waveform generating unit 11G42 generates the PDM waveform corresponding to the excitation signal Sin_1X for the SIN exciting coil 12, the PDM waveform corresponding to the excitation signal Cos_1X for the COS exciting coil 13, the PDM waveform corresponding to the excitation signal Sin_nX for the SIN exciting coil 15, or the PDM waveform corresponding to the excitation signal Cos_nX for the COS exciting coil 16, and outputs, from the control device 11G, the excitation signal Sin_1X for the SIN exciting coil 12, the excitation signal Cos_1X for the COS exciting coil 13, the excitation signal Sin_nX for the SIN exciting coil 15, and the excitation signal Cos_nX for the COS exciting coil 16.

Hence, in the example illustrated in FIG. 3, as in a first modification illustrated in FIG. 4 described below, it is possible to eliminate the necessity to provide a waveform generating unit R42 that generates the PDM waveform corresponding to the excitation signal Sin_1X for the SIN exciting coil 12, a waveform generating unit R42-2 that generates the PDM waveform corresponding to the excitation signal Cos_1X for the COS exciting coil 13, a waveform generating unit R42-3 that generates the PDM waveform corresponding to the excitation signal Sin_nX for the SIN exciting coil 15, and a waveform generating unit R42-4 that generates the PDM waveform corresponding to the excitation signal Cos_nX for the COS exciting coil 16, separately (in parallel).

In the example illustrated in FIG. 3, as described above, the waveform memory 11G451 stores the information for generating the PDM waveform corresponding to the excitation signal Sin_1X for the SIN exciting coil 12 generated by the waveform generating unit 11G42, the waveform memory 11G452 stores the information for generating the PDM waveform corresponding to the excitation signal Cos_1X for the COS exciting coil 13 generated by the waveform generating unit 11G42, the waveform memory 11G453 stores the information for generating the PDM waveform corresponding to the excitation signal Sin_nX for the SIN exciting coil 15 generated by the waveform generating unit 11G42, and the waveform memory 11G454 stores the PDM waveform corresponding to the excitation signal Cos_nX for the COS exciting coil 16 generated by the waveform generating unit 11G42.

The control logic 11G41 is simply required to read out the information for generating the PDM waveform stored in the waveform memory 11G451 to generate the excitation signal Sin_1X for the SIN exciting coil 12. Specifically, the information for generating the PDM waveform indicates information including a modulated wave component and a carrier component. Therefore, according to the embodiment, it is possible to easily obtain the PDM waveform on the basis of the modulated wave component and the carrier component. Moreover, the control logic 11G41 is simply required to read out the information for generating the PDM waveform stored in the waveform memory 11G452 to generate the excitation signal Cos_1X for the COS exciting coil 13. Specifically, the information for generating the PDM waveform indicates information including a modulated wave component and a carrier component. Therefore, according to the embodiment, it is possible to easily obtain the PDM waveform on the basis of the modulated wave component and the carrier component. Furthermore, the control logic 11G41 is simply required to read out the information for generating the PDM waveform stored in the waveform memory 11G453 to generate the excitation signal Sin_nX for the SIN exciting coil 15. Specifically, the information for generating the PDM waveform indicates information including a modulated wave component and a carrier component. Therefore, according to the embodiment, it is possible to easily obtain the PDM waveform on the basis of the modulated wave component and the carrier component. Moreover, the control logic 11G41 is simply required to read out the information for generating the PDM waveform stored in the waveform memory 11G454 to generate the excitation signal Cos_nX for the COS exciting coil 16. Specifically, the information for generating the PDM waveform indicates information including a modulated wave component and a carrier component. Therefore, according to the embodiment, it is possible to easily obtain the PDM waveform on the basis of the modulated wave component and the carrier component.

Hence, in the example illustrated in FIG. 3, the maximum operating frequency of the control device 11G is not limited in signal processing for generating a waveform, and the control device 11G can operate up to the operating limits of internal memory of the control device 11G.

In the example illustrated in FIG. 3, the waveform generating unit 11G42 may be operated at low speeds. Therefore, as described above, it is possible to set the amplitude value of the amplitude modulated wave to a variable and change the amplitude value of the amplitude modulated wave through communication from the outside.

Figure 4:
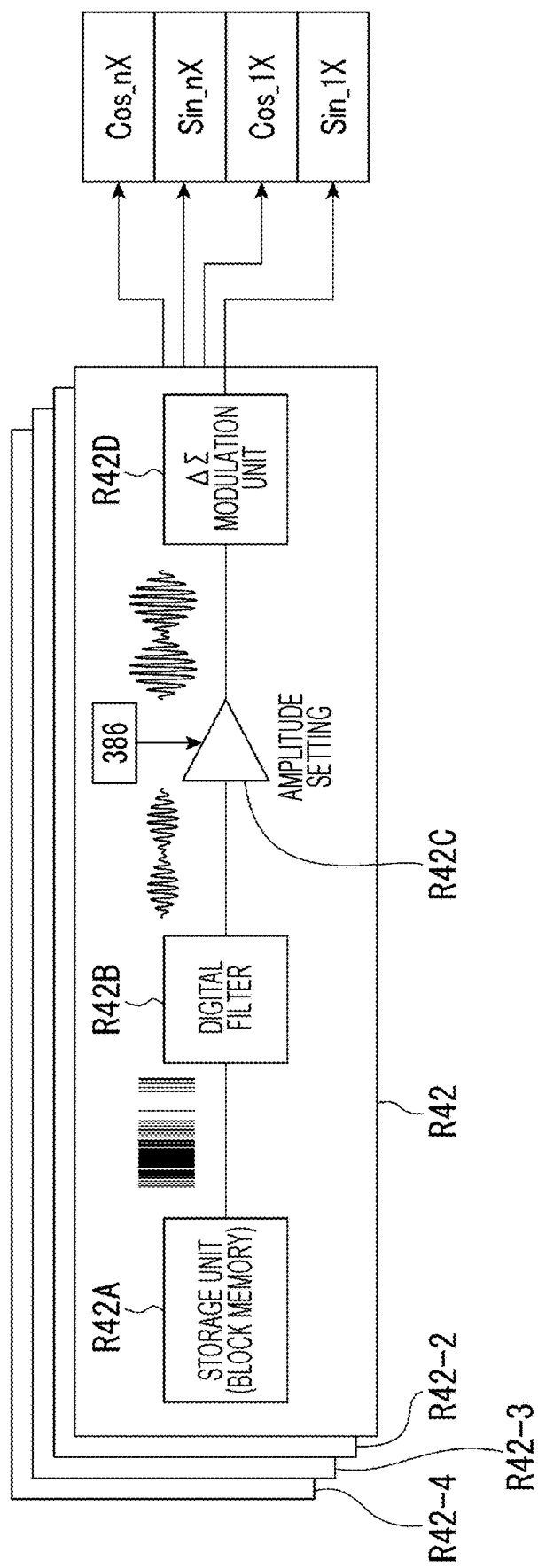
FIG. 4 is a diagram illustrating the configurations of waveform generating units R42, R42-2, R42-3, and R42-4 of a first modification.

FIG. 4 is a diagram illustrating the configurations of the waveform generating units R42, R42-2, R42-3, and R42-4 of the first modification.

In the first modification illustrated in FIG. 4, the waveform generating unit R42 that generates the PDM waveform corresponding to the excitation signal Sin_1X for the SIN exciting coil 12, the waveform generating unit R42-2 that generates the PDM waveform corresponding to the excitation signal Cos_1X for the COS exciting coil 13, the waveform generating unit R42-3 that generates the PDM waveform corresponding to the excitation signal Sin_nX for the SIN exciting coil 15, and the waveform generating unit R42-4 that generates the PDM waveform corresponding to the excitation signal Cos_nX for the COS exciting coil 16 are provided separately (in parallel).

Each of the waveform generating units R42, R42-2, R42-3, and R42-4 includes a storage unit R42A, a digital filter R42B, an amplifier R42C, and a $\Delta\Sigma$ modulation unit R42D. The storage unit R42A stores a PDM waveform (PDM data). The digital filter R42B converts the PDM waveform (PDM data) outputted from the storage unit R42A into an amplitude modulated wave (analog waveform). The amplifier R42C amplifies the amplitude modulated wave (analog waveform) generated by the digital filter R42B. The $\Delta\Sigma$ modulation unit R42D performs $\Delta\Sigma$ modulation on the amplitude modulated wave amplified by the amplifier R42C.

In other words, in the first modification illustrated in FIG. 4, in light of the point of running low on memory when the waveform of the modulated wave is held as it is, the waveform is held as the PDM data (stored in the storage unit R42A). The digital filter R42B temporarily converts the PDM data back into an analog waveform, and the $\Delta\Sigma$ modulation unit R42D generates a PDM waveform anew. As a result, the each of the waveform generating units R42, R42-2, R42-3, and R42-4 illustrated in FIG. 4 needs to include the digital filter R42B, which results in a redundant configuration compared to the waveform generating unit 11G42 illustrated in FIG. 3.

Moreover, in the first modification illustrated in FIG. 4, the waveform generating units R42, R42-2, R42-3, and R42-4 need to be provided separately (in parallel), which results in a redundant configuration compared to the example illustrated in FIG. 3 in which only one waveform generating unit 11G42 is included.

Furthermore, if the configuration of the first modification illustrated in FIG. 4 is employed, the numerical value of the $\Delta\Sigma$ modulation process by the $\Delta\Sigma$ modulation unit R42D requires as large a maximum value as 17 bits (17 signal lines). Therefore, the maximum operating frequency of the control device (FPGA) is reduced. As a result, it cannot satisfy operation at 66 MHz, depending on the amplitude value, which results in a distortion in the waveform.

Hence, in the first modification illustrated in FIG. 4, the amplitude value has to be a fixed description due to the above-mentioned problem of the maximum operating frequency. If the amplitude value needs to be changed, software of the control device (FPGA) needs to be rewritten.

In the resolver signal processing apparatus 1 of the first embodiment, for example, the configuration illustrated in FIG. 3 is employed to enable solving the problems of the first modification illustrated in FIG. 4.

Figure 5:
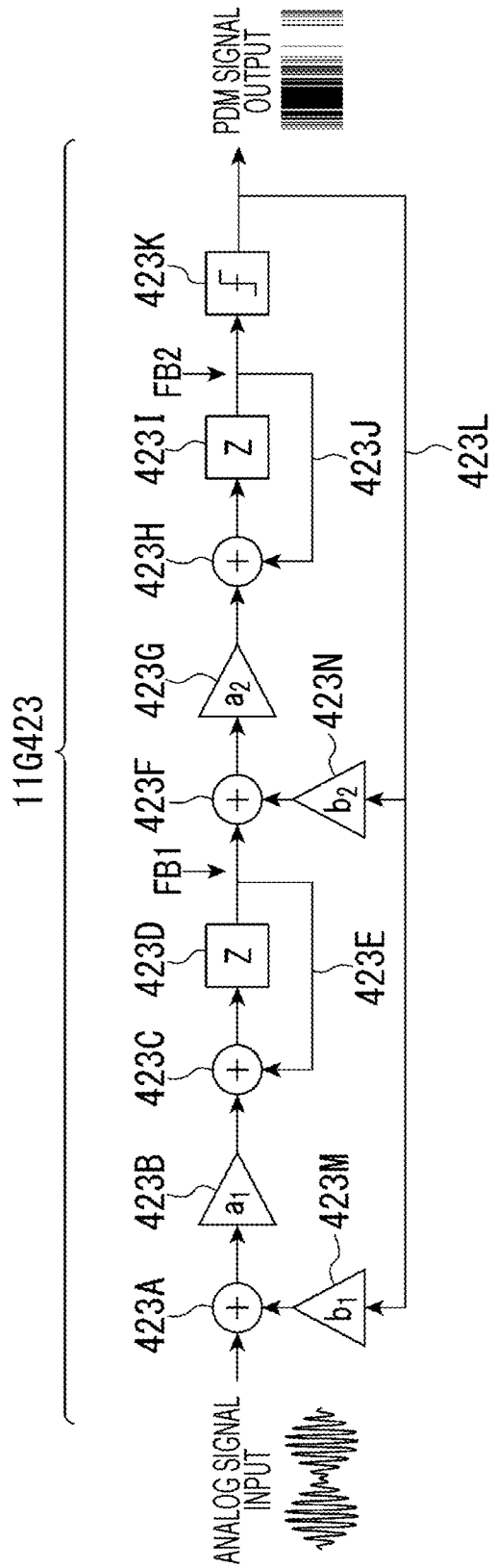
FIG. 5 is a diagram illustrating an example of the configuration of a $\Delta\Sigma$ modulation unit 11G423 of the waveform generating unit 11G42 of the control device 11G of the resolver signal processing apparatus 1 of the first embodiment.

FIG. 5 is a diagram illustrating an example of the configuration of the $\Delta\Sigma$ modulation unit 11G423 of the waveform generating unit 11G42 of the control device 11G of the resolver signal processing apparatus 1 of the first embodiment.

In the example illustrated in FIG. 5, the ΔΣ modulation unit 11G423 includes an addition unit 423A, an amplifier 423B, an addition unit 423C, a Z-transform unit 423D, a feedback unit 423E, an addition unit 423F, an amplifier 423G, an addition unit 423H, a Z-transform unit 423I, a feedback unit 423J, a comparator 423K, a feedback unit 423L, an amplifier 423M, and an amplifier 423N.

For example, the amplitude modulated wave (analog signal) amplified by the amplifier 11G422 (refer to FIG. 3) is inputted into the addition unit 423A. An output signal from the addition unit 423A is inputted into the amplifier 423B. The amplifier 423B amplifies the signal inputted from the addition unit 423A.

An output signal from the amplifier 423B, and a signal fed back by the feedback unit 423E are inputted into the addition unit 423C. The addition unit 423C adds the output signal from the amplifier 423B and the signal fed back by the feedback unit 423E and outputs the added signal.

The output signal from the addition unit 423C is inputted into the Z-transform unit 423D. The Z-transform unit 423D performs the Z-transform on the signal inputted from the addition unit 423C. An output signal from the Z-transform unit 423D is inputted into the feedback unit 423E and the addition unit 423F.

The feedback unit 423E feeds the output signal from the Z-transform unit 423D back into the addition unit 423C.

For example, the output signal from the Z-transform unit 423D is inputted into the addition unit 423F. An output signal from the addition unit 423F is inputted into the amplifier 423G. The amplifier 423G amplifies the signal inputted from the addition unit 423F.

An output signal from the amplifier 423G, and a signal fed back by the feedback unit 423J are inputted into the addition unit 423H. The addition unit 423H adds the output signal from the amplifier 423G, and the signal fed back by the feedback unit 423J, and outputs the added signal.

An output signal from the addition unit 423H is inputted into the Z-transform unit 423I. The Z-transform unit 423I performs the Z-transform on the signal inputted from the addition unit 423H. An output signal from the Z-transform unit 423I is inputted into the feedback unit 423J and the comparator 423K.

The feedback unit 423J feeds the output signal from the Z-transform unit 423I back into the addition unit 423H.

The output signal from the Z-transform unit 423I is inputted into the comparator 423K. The comparator 423K outputs, to the waveform memory 11G451, the PDM waveform corresponding to the excitation signal Sin_1X for the SIN exciting coil 12 (refer to FIG. 3). Moreover, the comparator 423K outputs, to the waveform memory 11G452, the PDM waveform corresponding to the excitation signal Cos_1X for the COS exciting coil 13 (refer to FIG. 3). Furthermore, the PDM waveform corresponding to the excitation signal Sin_nX for the SIN exciting coil 15 (refer to FIG. 3) is outputted to the waveform memory 11G453, and the PDM waveform corresponding to the excitation signal Cos_nX for the COS exciting coil 16 (refer to FIG. 3) is outputted to the waveform memory 11G454.

The feedback unit 423L feeds the output signal from the comparator 423K back into the amplifier 423M and the amplifier 423N. In other words, the output signal from the comparator 423K that is fed back by the feedback unit 423L is inputted into the amplifier 423M. Moreover, the output signal from the comparator 423K that is fed back by the feedback unit 423L is inputted also into the amplifier 423N.

The amplifier 423M amplifies the output signal from the comparator 423K that is fed back by the feedback unit 423L. An output signal from the amplifier 423M is inputted into the addition unit 423A. The addition unit 423A adds the output signal (amplitude modulated wave) from the amplifier 11G422 (refer to FIG. 3) and the output signal from the amplifier 423M.

The amplifier 423N amplifies the output signal from the comparator 423K that is fed back by the feedback unit 423L. An output signal from the amplifier 423N is inputted into the addition unit 423F. The addition unit 423F adds the output signal from the Z-transform unit 423D and the output signal from the amplifier 423N.

In other words, in the example illustrated in FIG. 5, the ΔΣ modulation unit 11G423 is a second-order ΔΣ modulator, and includes a feedback ΔΣ modulator.

Digital operation and sampling frequency require a sufficiently high frequency band compared to a band of an analog signal. For example, a frequency band approximately 100 times higher than the band of an analog signal is required. If 250 kHz is used as the frequency of a carrier wave, signal processing at 25 MHz or higher is required.

In the examples illustrated in FIGS. 2 and 5, a clock of 100 MHz to be outputted by the PLL 11G3 is used.

Next, an example of generation of a PDM waveform is described with reference to FIGS. 6 to 8. In the embodiment, when the waveform of a modulated wave from which a PDM signal is produced is generated, sine wave data may be held as a table. In order to save the amount of data used, the sine wave data held as a table may be one table datum, and a modulated waveform may be generated by performing a multiplication on the basis of the sine wave data.

FIG. 6 is a diagram for explaining a Sin table for generating a PDM waveform according to the first embodiment. A Sin table (one table datum) for generating the waveform of a modulated wave from which a PDM signal is produced is described with reference to FIG. 6. A fundamental wave (Sin(θ)), and a waveform of which the frequency is 32 times greater than the fundamental wave (Sin(32θ)) (it can also be said that the wavelength is 1/32) are illustrated on the left side of FIG. 6. According to the embodiment, these waveforms are multiplied, so that a waveform (Sin(θ)×Sin(32θ)=Sin(32θ+θ)+Sin(32θ−θ)) illustrated on the right side can be obtained.

Note that the example of the illustrated graph is an image, and, for example, the amplitude and the frequency may be different from the actual waveform.

Figures 7A, 7B:
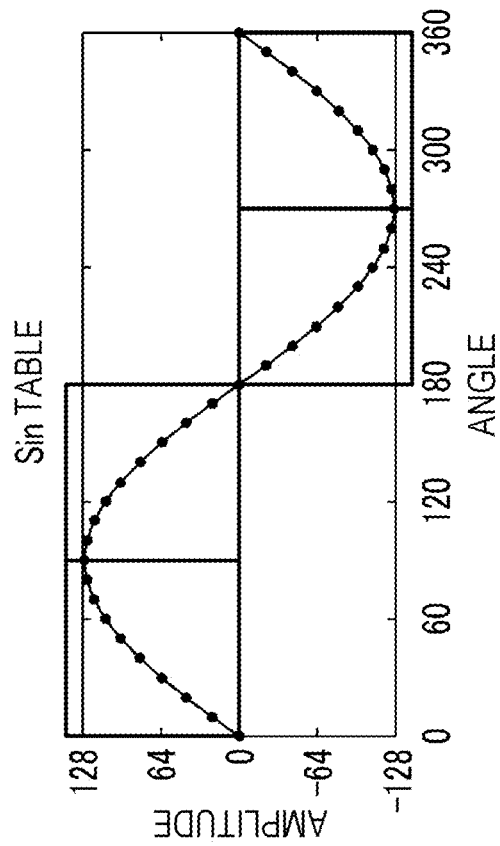
FIGS. 7A and 7B are diagrams for explaining the details of the Sin table for generating a PDM waveform according to the first embodiment.

FIGS. 7A and 7B are diagrams for explaining the details of the Sin table for generating a PDM waveform according to the first embodiment. The details of the Sin table (one table datum) for generating the waveform of a modulated wave from which a PDM signal is produced are described with reference to FIGS. 7A and 7B. The Sin function is symmetric and, therefore, it is divided into cases according to the value of an input θ, so that the amount of data stored can be reduced to ¼. FIG. 7A illustrates an example of the Sin table that is a fundamental wave. FIG. 7B illustrates an example of data to be stored. The horizontal axes illustrated in FIGS. 7A and 7B indicate angle, and the vertical axes indicate amplitude. As illustrated in FIG. 7B, data to be actually stored is a part of the fundamental wave (specifically, an interval from 0 degrees to 90 degrees). In a case of 8-bit data, the amount of data of a waveform illustrated in FIG. 7B is 8 [bit]×2^(12−2)=8192 [bit], and is the amount of data that fits into one block memory (block RAM).

Note that if a modulated wave is directly put in tabular form, the modulated wave is not symmetric, so that it is difficult to reduce the amount of data. The amount of data in the case in which a modulated wave is directly put in tabular form is 8 [bit]×2^12=32 [Kbit], and is the amount of data requiring four EBR blocks. In other words, a part of the fundamental wave (specifically, the interval from 0 degrees to 90 degrees) is stored, so that the amount of data can be reduced to ¼.

The process of generating a PDM waveform can be performed at low speeds. Therefore, one Sin function table may be used to generate a modulated wave by reading out the inputs θ and 32θ sequentially and then multiplying them. In this case, one block is sufficient for the EBR used for the process. Note that if two blocks are used, the storage area can be expanded; therefore, the resolution is set at 2^13 to enable generation of a modulated wave with a higher degree of accuracy.

Figure 8:
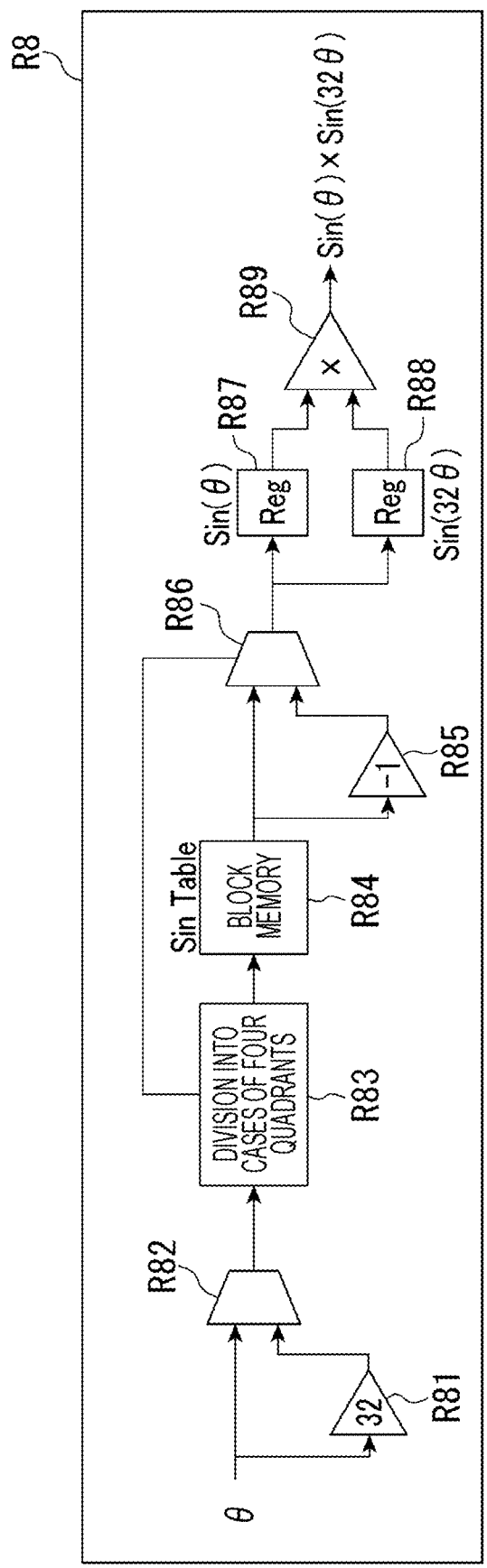
FIG. 8 is a diagram for explaining the generation of a PDM waveform according to the first embodiment.

FIG. 8 is a diagram for explaining the generation of a PDM waveform according to the first embodiment. The generation of a PDM waveform is described with reference to FIG. 8. A configuration R8 is an example of a specific aspect for performing a PDM waveform generation process such as described with reference to FIG. 6. The configuration R8 is configured, including a component R81 to a component R89. The component R81 is an amplifier. The component R81 amplifies θ by 32 times, and outputs the amplified result. The component R82 is a selector. θ and 32θ are inputted into the component R82. The component R82, which is the selector, outputs either θ or 32θ. The output result of the component R82 is inputted into the component R83. The component R83 produces an output in accordance with the angle of θ or 32θ inputted. The component R84 is a storage unit (for example, a block memory). A part of the Sin table that is the fundamental wave (for example, ¼ of one wavelength) is stored in the component R84. The component R84 outputs the stored data to the component R85 or the component R86. The component R85 is an amplifier. The component R85, which is the amplifier, multiplies the output value of the component R84 by −1 time and outputs the value to the component R86. The component R86 is a selector. A part of the Sin table that is the fundamental wave (for example, ¼ of one wavelength), or data obtained by multiplying the part by −1 time is inputted into the component R86. The output of the component R86, which is the selector, is controlled by the component R83. The output of the component R86 is stored in the component R87 or the component R88. The component R87 and the component R88 are registerers for storing values. The waveform of Sin(θ) is stored in the component R87. The waveform of Sin(32θ) is stored in the component R88. Sin(θ) stored in the component R87 and Sin(32θ) stored in the component R88 are inputted into the component R89. The component R89 outputs Sin(θ)×Sin(32θ) that is a result of multiplication of Sin(θ) and Sin(32θ) that have been inputted.

Figure 9A:
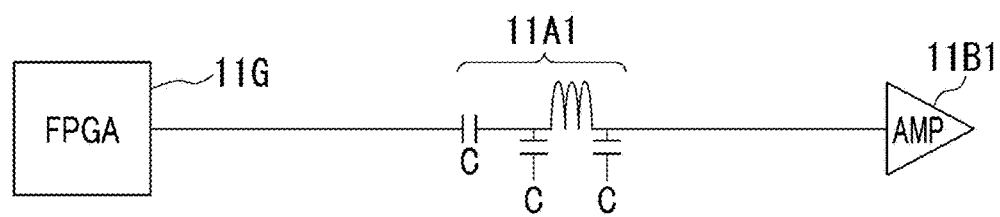
FIGS. 9A and 9B are diagrams illustrating, for example, a specific example of a band-pass filter 11A1 of an excitation waveform generating unit 11A of the resolver signal processing apparatus 1 of the first embodiment.
Figure 9B:

FIGS. 9A and 9B are diagrams illustrating, for example, a specific example of the band-pass filter 11A1 of the excitation waveform generating unit 11A of the resolver signal processing apparatus 1 of the first embodiment. Specifically, FIG. 9A illustrates a specific example of the band-pass filter 11A1 of the excitation waveform generating unit 11A of the resolver signal processing apparatus 1 of the first embodiment. FIG. 9B illustrates a modification of the excitation waveform generating unit 11A and the amplifier 11B1 of the resolver signal processing apparatus 1 of the first embodiment.

In the example illustrated in FIG. 9A, the band-pass filter 11A1 of the excitation waveform generating unit 11A of the resolver signal processing apparatus 1 of the first embodiment includes a πLC filter.

In the modification (an example of a direct switching method) illustrated in FIG. 9B, an FET (field effect transistor) is used instead of the excitation waveform generating unit 11A and the amplifier 11B1 that are illustrated in FIG. 1.

Figure 10:
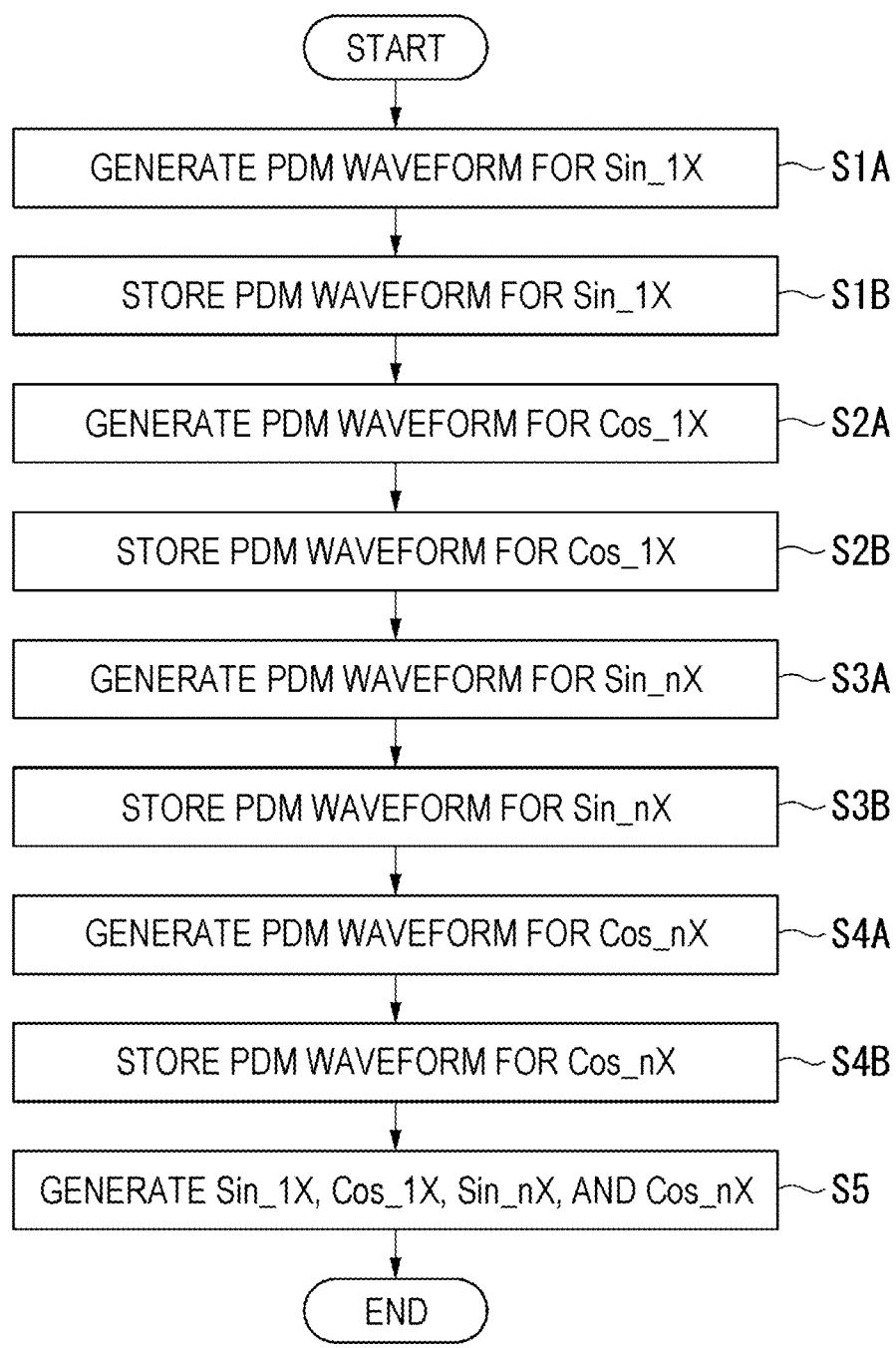
FIG. 10 is a flowchart for explaining an example of a process to be executed by the control device 11G of the resolver signal processing apparatus 1 of the first embodiment.

FIG. 10 is a flowchart for explaining an example of a process to be executed by the control device 11G of the resolver signal processing apparatus 1 of the first embodiment.

In the example illustrated in FIG. 10, in step S1A, the waveform generating unit 11G42 of the control device 11G performs ΔΣ modulation to generate the PDM waveform corresponding to the excitation signal Sin_1X for the SIN exciting coil 12.

Next, in step S1B, the waveform memory 11G451 of the control device 11G stores the PDM waveform corresponding to the excitation signal Sin_1X for the SIN exciting coil 12 generated in step S1A.

Moreover, in step S2A, the waveform generating unit 11G42 of the control device 11G performs ΔΣ modulation to generate the PDM waveform corresponding to the excitation signal Cos_1X for the COS exciting coil 13.

Next, in step S2B, the waveform memory 11G452 of the control device 11G stores the PDM waveform corresponding to the excitation signal Cos_1X for the COS exciting coil 13 generated in step S2A.

Moreover, in step S3A, the waveform generating unit 11G42 of the control device 11G performs ΔΣ modulation to generate the PDM waveform corresponding to the excitation signal Sin_nX for the SIN exciting coil 15.

Next, in step S3B, the waveform memory 11G453 of the control device 11G stores the PDM waveform corresponding to the excitation signal Sin_nX for the SIN exciting coil 15 generated in step S3A.

Moreover, in step S4A, the waveform generating unit 11G42 of the control device 11G performs ΔΣ modulation to generate the PDM waveform corresponding to the excitation signal Cos_nX for the COS exciting coil 16.

Next, in step S4B, the waveform memory 11G454 of the control device 11G stores the PDM waveform corresponding to the excitation signal Cos_nX for the COS exciting coil 16 generated in step S4A.

Next, in step S5, the control logic 11G41 of the control device 11G generates the excitation signal Sin_1X for the SIN exciting coil 12, the excitation signal Cos_1X for the COS exciting coil 13, the excitation signal Sin_nX for the SIN exciting coil 15, and the excitation signal Cos_nX for the COS exciting coil 16, and outputs the signals from the control device 11G.

EXAMPLES

The inventor performed an analysis by comparing a distortion in the excitation waveform in the resolver signal processing apparatus 1 of the first embodiment that uses PDM waveforms to generate the excitation waveforms for the SIN exciting coil 12, the COS exciting coil 13, the SIN exciting coil 15, and the COS exciting coil 16, and an angle error by the resolver sensor 1A incident to the distortion, and a distortion in the excitation waveform in a resolver signal processing apparatus of a first comparative example that uses PWM (pulse-width modulation) waveforms to generate excitation waveforms, and an angle error by a resolver sensor incident to the distortion.

An angle error by the resolver sensor was ±2.34° in the resolver signal processing apparatus of the first comparative example that uses PWM waveforms, whereas an angle error by the resolver sensor 1A was ±0.12° and could be reduced to ½0 in the resolver signal processing apparatus 1 of the first embodiment that uses PDM waveforms.

Figure 11A:
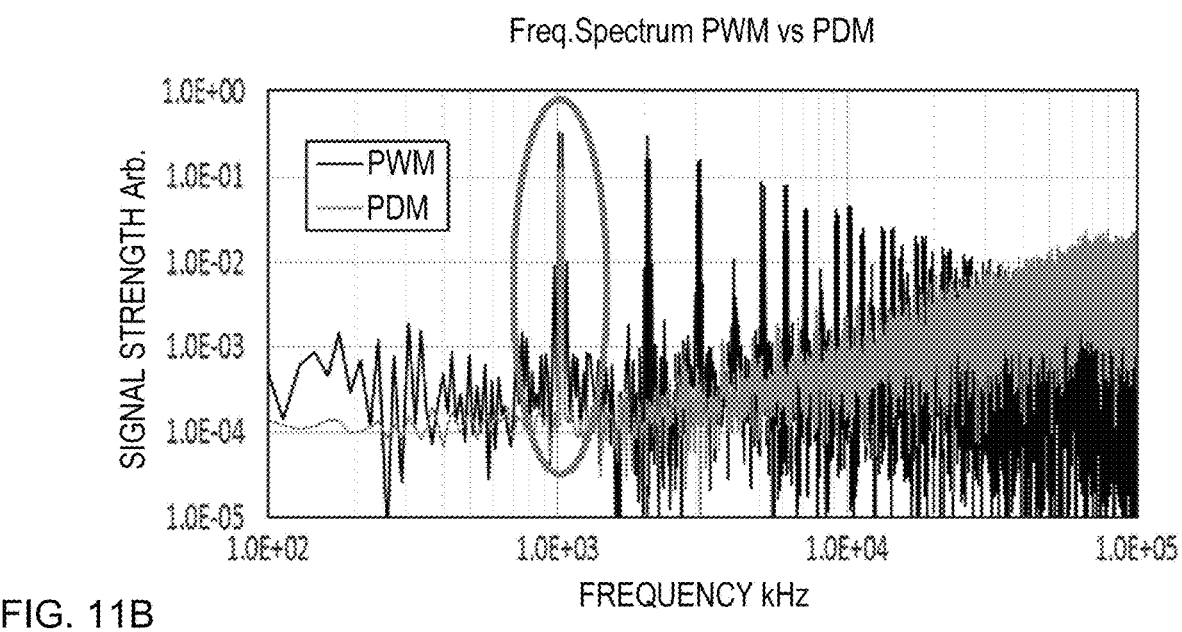
FIGS. 11A and 11B are diagrams of a comparison between a resolver signal processing apparatus of a first comparative example that uses PWM waveforms and the resolver signal processing apparatus 1 of the first embodiment that uses PDM waveforms, in terms of a relationship (spectrum) between frequency and signal strength.
Figure 11B:
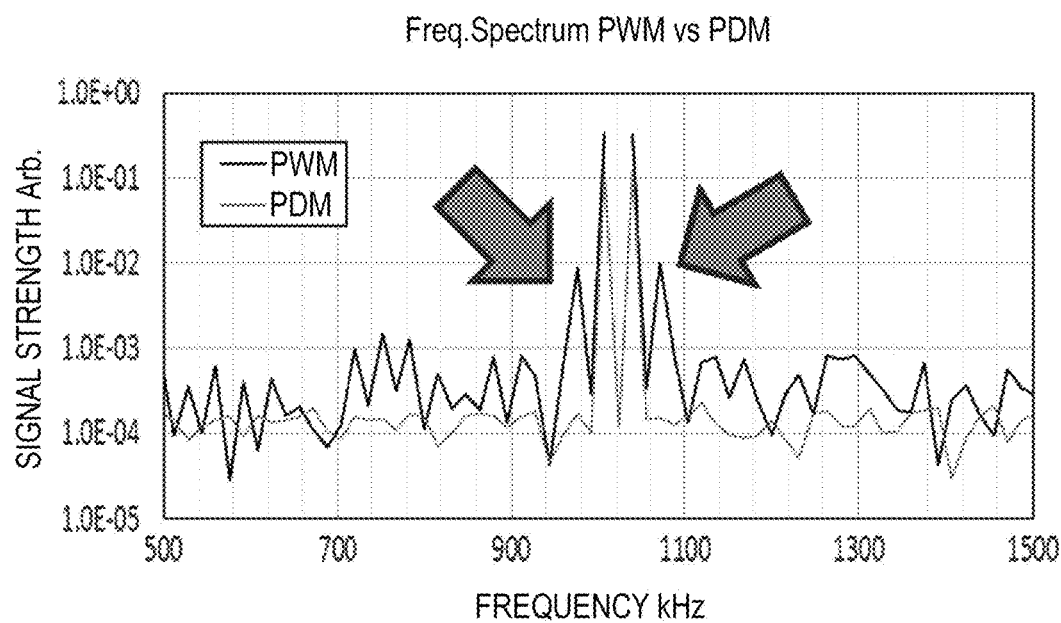

FIGS. 11A and 11B are diagrams of a comparison between the resolver signal processing apparatus of the first comparative example that uses PWM waveforms and the resolver signal processing apparatus 1 of the first embodiment that uses PDM waveforms, in terms of a relationship (spectrum) between frequency and signal strength. Specifically, FIG. 11B is a diagram illustrating the neighborhood of 1000 (kHz) in frequency of the horizontal axis of FIG. 11A in an enlarged manner.

As indicated by two arrows in FIG. 11B, there were places in which the signal strength was higher in the resolver signal processing apparatus of the first comparative example that uses PWM waveforms than in the resolver signal processing apparatus 1 of the first embodiment that uses PDM waveforms.

Figure 12A:
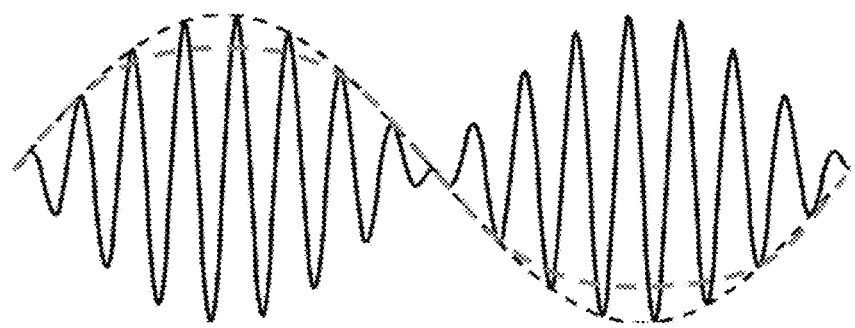
FIGS. 12A and 12B are for example, diagrams of a comparison between the resolver signal processing apparatus of the first comparative example that uses PWM waveforms and the resolver signal processing apparatus 1 of the first embodiment that uses PDM waveforms, in terms of the presence or absence of a distortion that occurred in an envelope if a waveform of 250 kHz±16 kHz was digitally modulated.
Figure 12B:
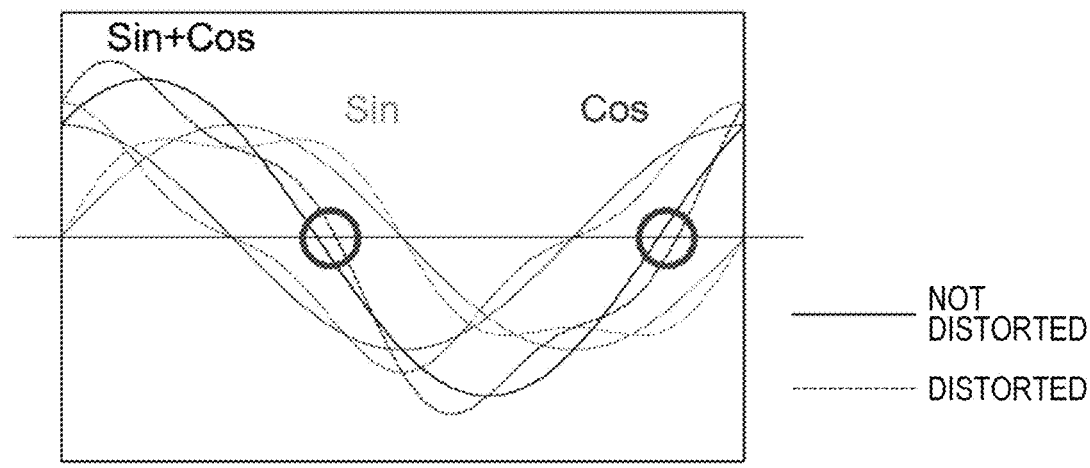

FIGS. 12A and 12B are, for example, diagrams of a comparison between the resolver signal processing apparatus of the first comparative example that uses PWM waveforms and the resolver signal processing apparatus 1 of the first embodiment that uses PDM waveforms, in terms of the presence or absence of a distortion that occurred in an envelope if a waveform of 250 kHz±16 kHz was digitally modulated Specifically, FIG. 12A illustrates a comparison between the resolver signal processing apparatus of the first comparative example that uses PWM waveforms and the resolver signal processing apparatus 1 of the first embodiment that uses PDM waveforms, in terms of the presence or absence of a distortion that occurred in an envelope if a waveform of 250 kHz±16 kHz was digitally modulated. FIG. 12B illustrates a comparison between a zero-crossing time in a case where a distortion occurred in the envelope and a zero-crossing time in a case where no distortion occurred in the envelope.

As illustrated in FIG. 12A, if the waveform of 250 kHz±16 kHz was digitally modulated in each of the resolver signal processing apparatus of the first comparative example that uses PWM waveforms and the resolver signal processing apparatus 1 of the first embodiment that uses PDM waveforms, a harmonic of 250 kHz±32 kHz, which is the double of ±16 kHz, occurred and a distortion occurred in the envelope in the resolver signal processing apparatus of the first comparative example that uses PWM waveforms, whereas no distortion occurred in the envelope in the resolver signal processing apparatus 1 of the first embodiment that uses PDM waveforms.

In a modulated wave resolver such as the resolver sensor 1A of the resolver signal processing apparatus 1 of the first embodiment, a composite signal of Sin and Cos signals is detected to calculate the angle of rotation of the resolver from the zero-crossing time of the composite signal.

As illustrated in FIG. 12B, if a distortion occurred in the envelope, the zero-crossing time of the composite signal changed, which results in an error in the detection angle by the resolver. In the resolver signal processing apparatus 1 of the first embodiment that uses PDM waveforms, no distortion occurred in the envelope. Therefore, the angle error by the resolver sensor 1A could be reduced.

Figure 13:
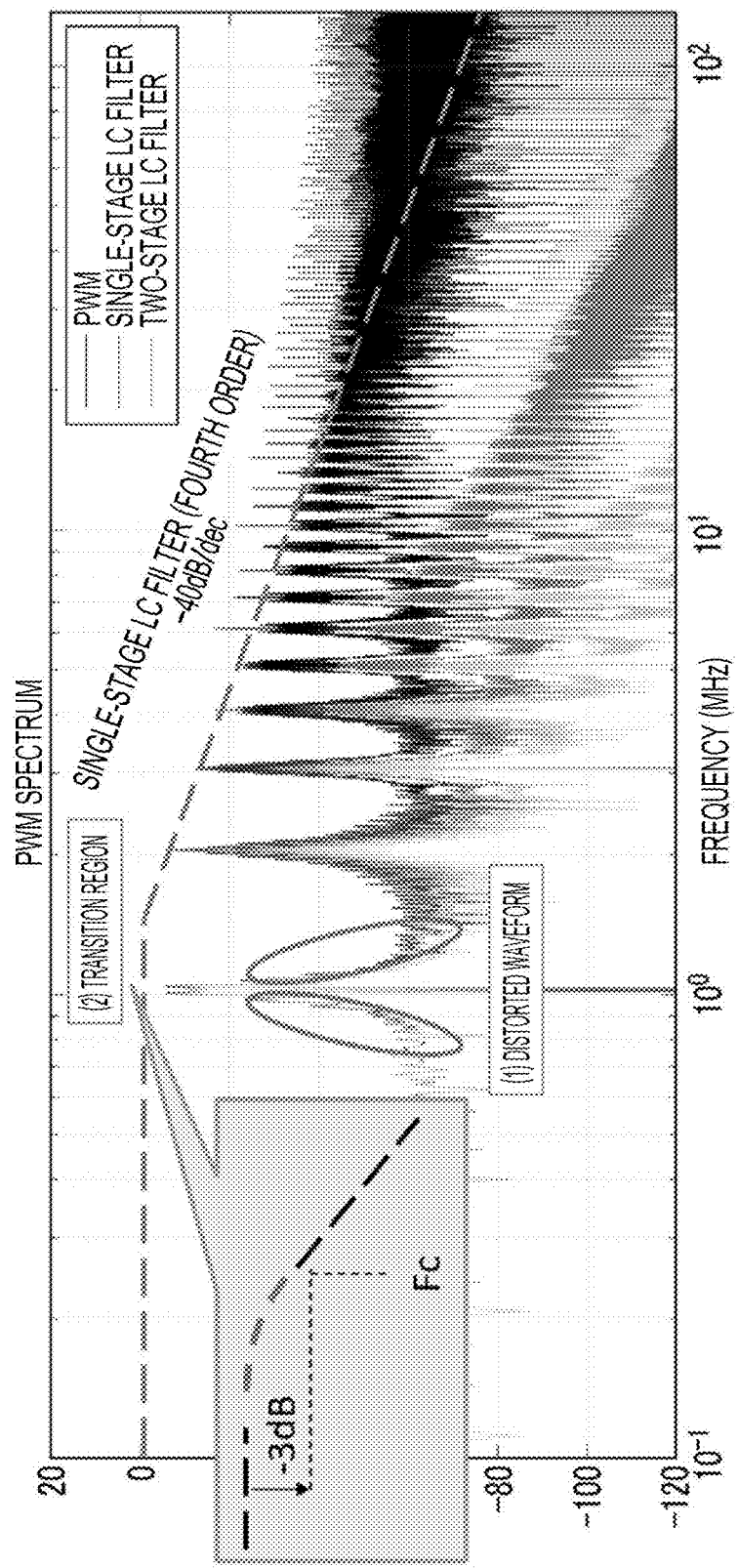
FIG. 13 is a diagram for explaining a problem of the resolver signal processing apparatus of the first comparative example that uses PWM waveforms to generate excitation waveforms.

FIG. 13 is a diagram for explaining a problem of the resolver signal processing apparatus of the first comparative example that uses PWM waveforms to generate excitation waveforms. Specifically, FIG. 13 illustrates the spectrum of the resolver signal processing apparatus of the first comparative example that uses PWM waveforms to generate excitation waveforms.

As indicated by "distorted waveform" in FIG. 13, in the resolver signal processing apparatus of the first comparative example that uses PWM waveforms to generate excitation waveforms, harmonics ±16 kHz×n (±16 kHz, ±48 kHz, ±80 kHz, . . . ) of a modulated wave component result in a distortion of 16 kHz upon demodulation (the distortion of the envelope illustrated in FIG. 12A), which results in an error in the absolute angle by the resolver sensor.

As indicated by "transition region" in FIG. 13, in the resolver signal processing apparatus of the first comparative example that uses PWM waveforms to generate excitation waveforms, it is desired to bring a cutoff frequency Fc of a filter as close to a carrier frequency as possible to attenuate discretization noise, however, there is the transition region and furthermore a filter constant L also varies (=the cutoff frequency Fc of the filter varies). Therefore, there is a problem that if the cutoff frequency Fc is too close, even the main signal results in attenuating.

Figure 14:
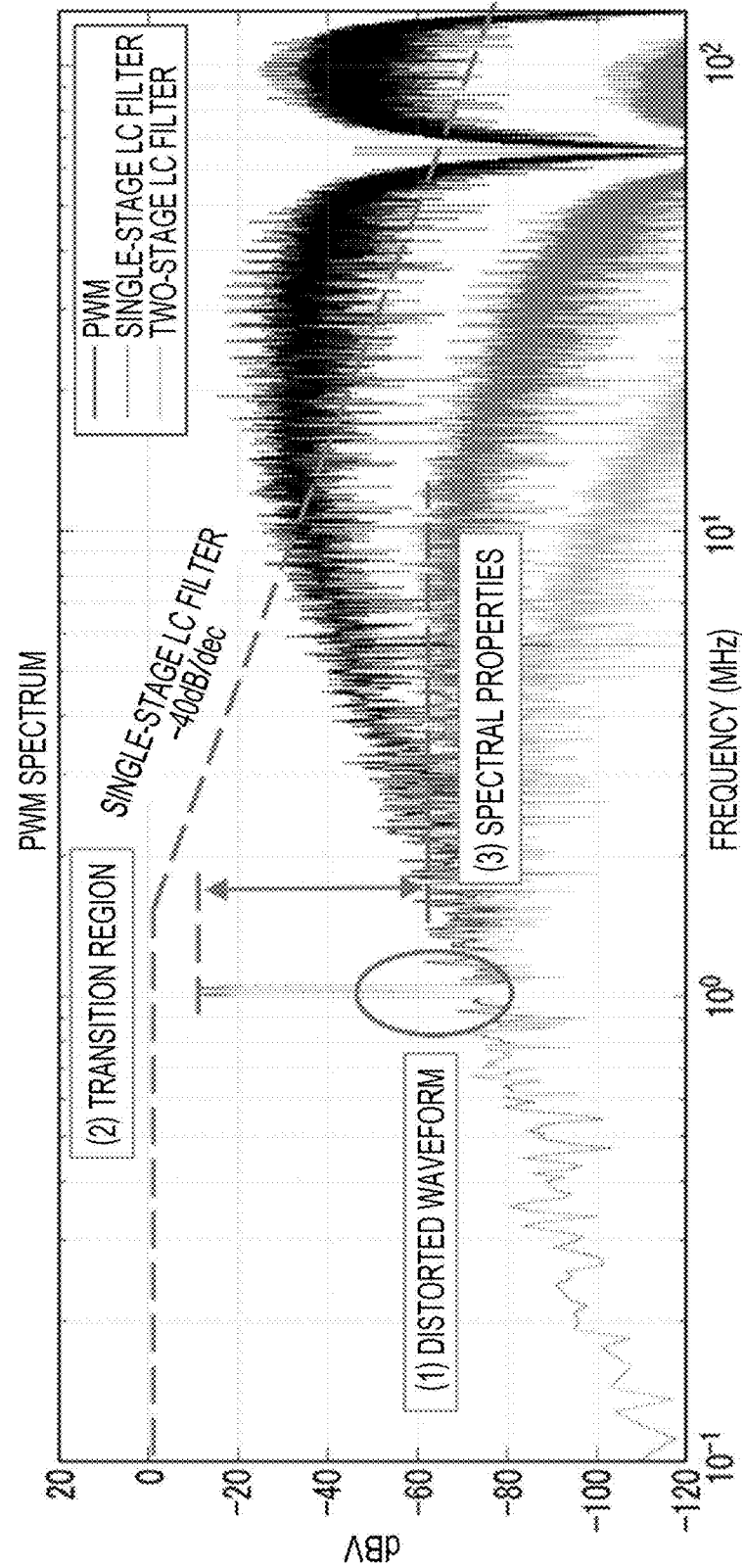
FIG. 14 is a diagram for explaining the effects of the resolver signal processing apparatus 1 of the first embodiment that uses PDM waveforms to generate excitation waveforms.

FIG. 14 is a diagram for explaining the effects of the resolver signal processing apparatus 1 of the first embodiment that uses PDM waveforms to generate excitation waveforms. Specifically, FIGS. 11A and 11B illustrate the spectrum of the resolver signal processing apparatus 1 of the first embodiment that uses PDM waveforms to generate excitation waveforms.

As indicated by "distorted waveform" and "spectral properties" in FIG. 14, harmonics ±16 kHz×n (±16 kHz, ±48 kHz, ±80 kHz, . . . ) of a modulated wave component that can be seen in the spectral properties of the resolver signal processing apparatus of the first comparative example that uses PWM waveforms illustrated in FIG. 10 are not present in the spectral properties of the resolver signal processing apparatus 1 of the first embodiment that uses PDM waveforms illustrated in FIG. 14.

As indicated by "transition region" in FIG. 14, in the resolver signal processing apparatus 1 of the first embodiment that uses PDM waveforms, the main component and the discretization noise spectrum are apart from each other. Therefore, the cutoff frequency Fc of the filter can be separated from the main component, so that it can make it difficult to be influenced by the filter constant variation.

Furthermore, in the spectral properties of the resolver signal processing apparatus 1 of the first embodiment that uses PDM waveforms, harmonic components 500 kHz, 750 kHz, 1000 kHz, . . . of the carrier component 250 kHz±16 kHz that can be seen in the spectral properties of the resolver signal processing apparatus of the first comparative example that uses PWM waveforms illustrated in FIG. 13 are not present. In the spectral properties of the resolver signal processing apparatus 1 of the first embodiment that uses PDM waveforms, the discretization noise tilts toward the harmonics. Therefore, in the resolver signal processing apparatus 1 of the first embodiment that uses PDM waveforms, attenuation by the filter works easily, and the number of stages of the filter can be reduced.

As described above, in the resolver signal processing apparatus 1 of the first embodiment, if an excitation signal generated by pulse-width modulation (PWM) is applied, distortions in the excitation waveforms that excite the SIN exciting coil 12 for the excitation coils (the SIN exciting coil 12 for 1X, the COS exciting coil 13 for 1X, the SIN exciting coil 15 for nX, and COS exciting coil 16 for nX) can be reduced, and an error in the angle of rotation that is detected by the resolver sensor 1A can be reduced.

Furthermore, in the resolver signal processing apparatus 1 of the first embodiment, a circuit production method that causes the waveform memories 11G451, 11G452, 11G453, and 11G454 to store the PDM waveforms generated by performing ΔΣ modulation is employed; therefore, the cost of the circuit configuration can be cut down as compared to a case where ΔΣ modulation is applied to a single-phase excitation/two-phase output resolver.

Second Embodiment

A second embodiment of the resolver-to-digital converter circuit, the resolver signal processing apparatus, the resolver signal processing method, and the program of the present invention is described below.

A resolver signal processing apparatus 1 of the second embodiment is configured similarly to the resolver signal processing apparatus 1 of the above-mentioned first embodiment, except points described below. Therefore, the resolver signal processing apparatus 1 of the second embodiment can exert effects similar to those of the resolver signal processing apparatus 1 of the above-mentioned first embodiment, except the points described below.

Figure 15:
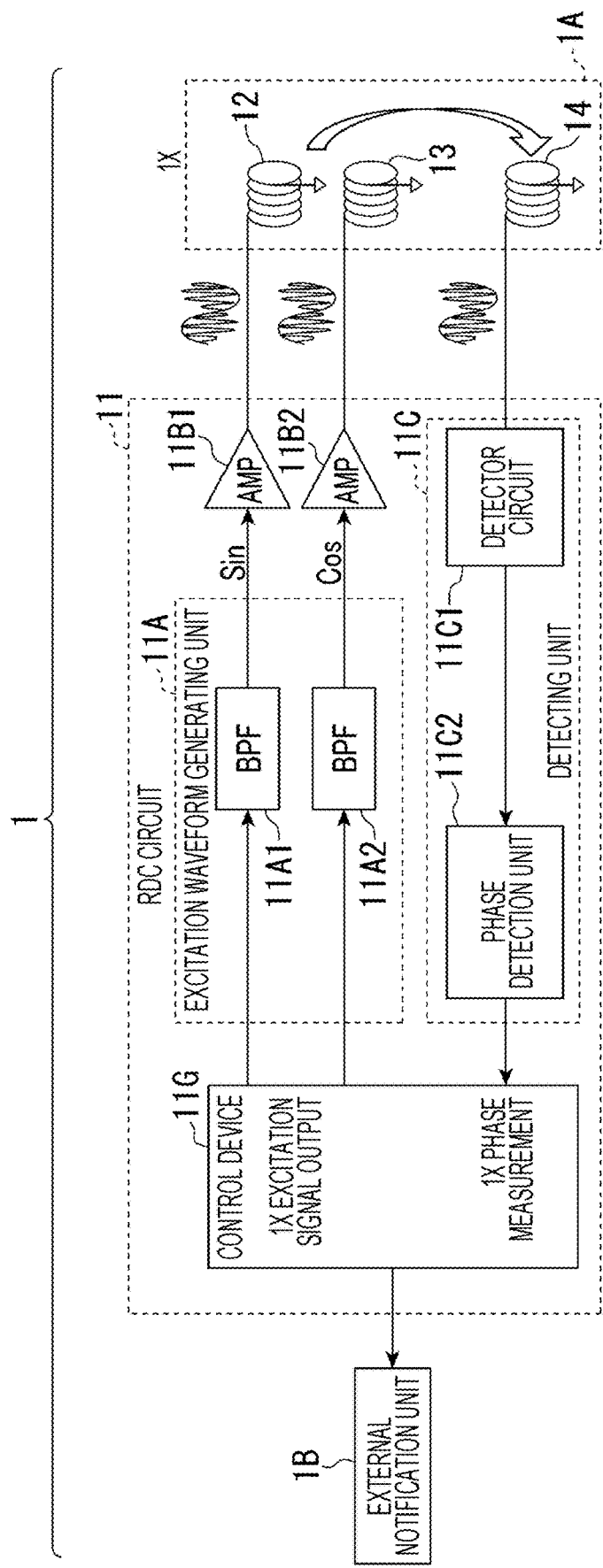
FIG. 15 is a diagram illustrating an example of a resolver signal processing apparatus 1 of a second embodiment.
Figure 16:
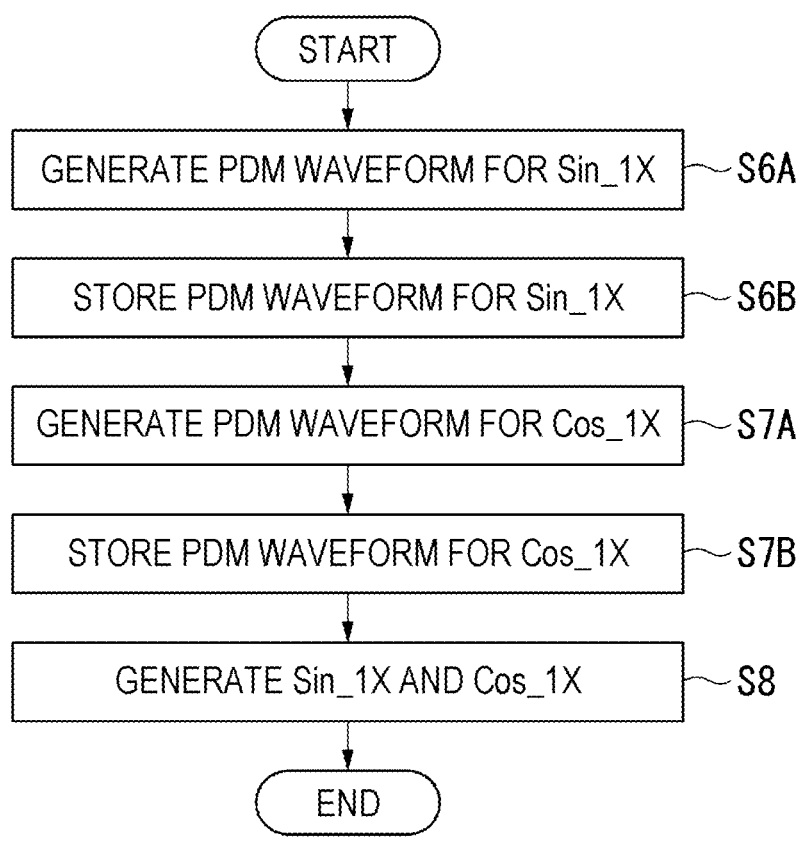
FIG. 16 is a flowchart for explaining an example of a process to be executed by a control device 11G of the resolver signal processing apparatus 1 of the second embodiment.

FIG. 15 is a diagram illustrating an example of the resolver signal processing apparatus 1 of the second embodiment.

In the example illustrated in FIG. 15, the resolver signal processing apparatus 1 includes the resolver-to-digital converter circuit 11, the resolver sensor 1A, and the external communication unit 1B.

In the example illustrated in FIG. 1, the resolver sensor 1A includes the SIN exciting coil 12 for 1X, the COS exciting coil 13 for 1X, the detecting coil 14 for 1X, the SIN exciting coil 15 for nX, the COS exciting coil 16 for nX, and the detecting coil 17 for nX. However, in the example illustrated in FIG. 15, the resolver sensor 1A includes the SIN exciting coil 12 for 1X, the COS exciting coil 13 for 1X, and the detecting coil 14 for 1X, and does not include the SIN exciting coil 15 for nX (refer to FIG. 1), the COS exciting coil 16 for nX (refer to FIG. 1), and the detecting coil 17 for nX (refer to FIG. 1).

In the example illustrated in FIG. 1, the resolver-to-digital converter circuit 11 includes the excitation waveform generating unit 11A, the amplifiers 11B1 and 11B2, the detecting unit 11C, the excitation waveform generating unit 11D, the amplifiers 11E1 and 11E2, the detecting unit 11F, and the control device 11G. However, in the example illustrated in FIGS. 12A and 12B, the resolver-to-digital converter circuit 11 includes the excitation waveform generating unit 11A, the amplifiers 11B1 and 11B2, the detecting unit 11C, and the control device 11G, and does not include the excitation waveform generating unit 11D (refer to FIG. 1), the amplifiers 11E1 and 11E2 (refer to FIG. 1), and the detecting unit 11F (refer to FIG. 1).

In the resolver signal processing apparatus 1 of the first embodiment, the control device 11G includes the waveform memories 11G451, 11G452, 11G453, and 11G454. However, in the resolver signal processing apparatus 1 of the second embodiment, the control device 11G includes the waveform memories 11G451 and 11G452, and does not include the waveform memories 11G453 and 11G454 (refer to FIGS. 2 and 3).

Moreover, in the resolver signal processing apparatus 1 of the first embodiment, the control device 11G includes the phase measurement units 11G1 and 11G2 and the statistic processing unit 11G43. However, in the resolver signal processing apparatus 1 of the second embodiment, the control device 11G includes the phase measurement unit 11G1, and does not include the phase measurement unit 11G2 (refer to FIG. 2) and the statistic processing unit 11G43 (refer to FIG. 2).

In the resolver signal processing apparatus 1 of the second embodiment, the waveform generating unit 11G42 performs ΔΣ modulation to generate the PDM waveform corresponding to the excitation signal Sin_1X for the SIN exciting coil 12 (refer to FIG. 3), and the PDM waveform corresponding to the excitation signal Cos_1X for the COS exciting coil 13 (refer to FIG. 3). Specifically, the waveform generating unit 11G42 generates the PDM waveform corresponding to the excitation signal Sin_1X for the SIN exciting coil 12, and the PDM waveform corresponding to the excitation signal Cos_1X for the COS exciting coil 13 individually.

The control logic 11G41 generates the excitation signal Sin_1X for the SIN exciting coil 12, and the excitation signal Cos_1X for the COS exciting coil 13 at a timing different from a timing when the waveform generating unit 11G42 generates the PDM waveform corresponding to the excitation signal Sin_1X for the SIN exciting coil 12 or the PDM waveform corresponding to the excitation signal Cos_1X for the COS exciting coil 13, and outputs the excitation signal Sin_1X for the SIN exciting coil 12 and the excitation signal Cos_1X for the COS exciting coil 13 from the control device 11G.

FIG. 13 is a flowchart for explaining an example of a process to be executed by the control device 11G of the resolver signal processing apparatus 1 of the second embodiment.

In the example illustrated in FIG. 13, in step S6A, the waveform generating unit 11G42 of the control device 11G performs ΔΣ modulation to generate the PDM waveform corresponding to the excitation signal Sin_1X for the SIN exciting coil 12.

Next, in step S6B, the waveform memory 11G451 of the control device 11G stores the PDM waveform corresponding to the excitation signal Sin_1X for the SIN exciting coil 12 generated in step S6A.

Moreover, in step S7A, the waveform generating unit 11G42 of the control device 11G performs ΔΣ modulation to generate the PDM waveform corresponding to the excitation signal Cos_1X for the COS exciting coil 13.

Next, in step S7B, the waveform memory 11G452 of the control device 11G stores the PDM waveform corresponding to the excitation signal Cos_1X for the COS exciting coil 13 generated in step S7A.

Next, in step S8, the control logic 11G41 of the control device 11G generates the excitation signal Sin_1X for the SIN exciting coil 12 and the excitation signal Cos_1X for the COS exciting coil 13, and outputs the excitation signal Sin_1X for the SIN exciting coil 12 and the excitation signal Cos_1X for the COS exciting coil 13 from the control device 11G.

Up to this point the modes for carrying out the present invention are described by use of the embodiments. However, the present invention is not at all limited to these embodiments, and various modifications and replacements can be added within the scope within the scope that does not depart from the purport of the present invention. The configurations described in the above-mentioned embodiments and examples may be combined as appropriate.

Note that the whole or part of the functions of the units included in the resolver signal processing apparatus 1 in the above-mentioned embodiments may be achieved by recording a program for achieving these functions in a computer-readable recording medium, and causing a computer system to read and execute the program recorded in the recording medium. Note that the "computer system" here is assumed to include hardware such as an OS and a peripheral device.

Moreover, the "computer-readable recording medium" indicates a portable medium such as a flexible disk, a magneto-optical disk, ROM, or CD-ROM, or a storage unit such as a hard disk integrated into the computer system. Furthermore, the "computer-readable recording medium" may include one that holds the program dynamically for a short period of time as in a communication line of when the program is transmitted via a network such as the Internet or a communication line such as a telephone line, and one that holds the program for a fixed period of time as in a volatile memory in the computer system to be a server or client of when the program is held dynamically for a short period of time. Moreover, the above program may be one for achieving a part of the above-mentioned functions and furthermore may be one that can achieve the above-mentioned functions in combination with the program already recorded in the computer system.

The invention claimed is:

1. A resolver-to-digital converter circuit that performs signal processing on a resolver sensor including a SIN exciting coil, a COS exciting coil, and a detecting coil, the resolver-to-digital converter circuit comprising:
    a control device configured to generate an excitation signal, which is an amplitude modulated wave for the SIN exciting coil and an excitation signal, which is an amplitude modulated wave for the COS exciting coil;
    an excitation waveform generating unit configured to generate an excitation waveform for the SIN exciting coil from the excitation signal for the SIN exciting coil generated by the control device, and to generate an excitation waveform for the COS exciting coil from the excitation signal for the COS exciting coil generated by the control device; and
    a detecting unit configured to generate a signal indicating the angle of rotation of the resolver sensor on the basis of a detection signal outputted from the detecting coil, and
    the control device includes:
    a waveform generating unit configured to perform $\Delta\Sigma$ modulation to generate a pulse-density modulation (PDM) waveform corresponding to the excitation signal for the SIN exciting coil and a PDM waveform corresponding to the excitation signal for the COS exciting coil;
    a first waveform memory configured to store information for generating the PDM waveform corresponding to the excitation signal for the SIN exciting coil; and
    a second waveform memory configured to store information for generating the PDM waveform corresponding to the excitation signal for the COS exciting coil,
    a control logic configured to cause the waveform generating unit to execute a process of generating a PDM waveform, and
    the control logic
    generates the excitation signal for the SIN exciting coil corresponding to the PDM waveform stored in the first waveform memory, and
    generates the excitation signal for the COS exciting coil corresponding to the PDM waveform stored in the second waveform memory.

2. The resolver-to-digital converter circuit according to claim 1, wherein
    the first waveform memory stores a modulated wave component and a carrier component as separate independent information, and
    the second waveform memory stores a modulated wave component and a carrier component as separate independent information.

3. The resolver-to-digital converter circuit according to claim 1, wherein the detecting unit configured to detect a phase of rotation from the detection signal outputted from the detecting coil, and generate the signal indicating the angle of rotation of the resolver sensor.

4. The resolver-to-digital converter circuit according to claim 3, wherein the waveform generating unit includes:
    a storage unit configured to store an amplitude modulated wave;
    an amplifier configured to amplify the amplitude modulated wave stored in the storage unit; and
    a $\Delta\Sigma$ modulation unit configured to perform $\Delta\Sigma$ modulation on the amplitude modulated wave amplified by the amplifier, and
    the amplifier amplifies the amplitude modulated wave in response to an instruction of the control logic on an amplitude value.

5. The resolver-to-digital converter circuit according to claim 3, wherein
    the waveform generating unit generates the PDM waveform corresponding to the excitation signal for the SIN exciting coil, and the PDM waveform corresponding to the excitation signal for the COS exciting coil individually, and
    the control logic generates the excitation signal for the SIN exciting coil and the excitation signal for the COS exciting coil at a timing different from a timing when the waveform generating unit generates the PDM waveform corresponding to the excitation signal for the SIN exciting coil, or the PDM waveform corresponding to the excitation signal for the COS exciting coil.

6. The resolver-to-digital converter circuit according to claim 4, wherein the control device includes a communication unit configured to receive the instruction on the amplitude value transmitted by the control logic to the amplifier, from outside of the control device.

7. The resolver-to-digital converter circuit according to claim 4, wherein the $\Delta\Sigma$ modulation unit includes a $\Delta\Sigma$ modulator.

8. A resolver-to-digital converter circuit that performs signal processing on a resolver sensor including a SIN exciting coil, a COS exciting coil, and a detecting coil, the resolver-to-digital converter circuit comprising:
    a control device configured to generate an excitation signal for the SIN exciting coil and an excitation signal for the COS exciting coil;
    an excitation waveform generating unit configured to generate an excitation waveform for the SIN exciting coil from the excitation signal for the SIN exciting coil generated by the control device, and to generate an excitation waveform for the COS exciting coil from the excitation signal for the COS exciting coil generated by the control device; and
    a detecting unit configured to generate a signal indicating the angle of rotation of the resolver sensor on the basis of a detection signal outputted from the detecting coil, and
    the control device includes:
    a waveform generating unit configured to perform $\Delta\Sigma$ modulation to generate a pulse-density modulation (PDM) waveform corresponding to the excitation signal for the SIN exciting coil and a PDM waveform corresponding to the excitation signal for the COS exciting coil;

a first waveform memory configured to store information for generating the PDM waveform corresponding to the excitation signal for the SIN exciting coil; and a second waveform memory configured to store information for generating the PDM waveform corresponding to the excitation signal for the COS exciting coil, the resolver sensor includes another SIN exciting coil, another COS exciting coil, and another detecting coil, the control device generates an excitation signal for the other SIN exciting coil and an excitation signal for the other COS exciting coil, the resolver-to-digital converter circuit comprises:

another excitation waveform generating unit configured to generate an excitation waveform for the other SIN exciting coil from the excitation signal for the other SIN exciting coil generated by the control device, and to generate an excitation waveform for the other COS exciting coil from the excitation signal for the other COS exciting coil generated by the control device; and another detecting unit configured to generate a signal indicating the angle of rotation of the resolver sensor on the basis of a detection signal outputted from the other detecting coil, the waveform generating unit performs ΔΣ modulation to generate a PDM waveform corresponding to the excitation signal for the other SIN exciting coil and a PDM waveform corresponding to the excitation signal for the other COS exciting coil, and the control device includes:

a third waveform memory configured to store information for generating the PDM waveform corresponding to the excitation signal for the other SIN exciting coil; and a fourth waveform memory configured to store information for generating the PDM waveform corresponding to the excitation signal for the other COS exciting coil.

9. The resolver-to-digital converter circuit according to claim 8, wherein a control logic configured to cause the waveform generating unit to execute a process of generating a PDM waveform generates the excitation signal for the other SIN exciting coil corresponding to the PDM waveform stored in the third waveform memory, and generates the excitation signal for the other COS exciting coil corresponding to the PDM waveform stored in the fourth waveform memory.

10. The resolver-to-digital converter circuit according to claim 8, wherein the waveform generating unit generates the PDM waveform corresponding to the excitation signal for the SIN exciting coil, the PDM waveform corresponding to the excitation signal for the COS exciting coil, the PDM waveform corresponding to the excitation signal for the other SIN exciting coil, and the PDM waveform corresponding to the excitation signal for the other COS exciting coil individually, and the control logic generates the excitation signal for the SIN exciting coil, the excitation signal for the COS exciting coil, the excitation signal for the other SIN exciting coil, and the excitation signal for the other COS exciting coil at a timing different from a timing when the waveform generating unit generates the PDM waveform corresponding to the excitation signal for the SIN exciting coil, the PDM waveform corresponding to the excitation signal for the COS exciting coil, the PDM waveform corresponding to the excitation signal for the other SIN exciting coil, or the PDM waveform corresponding to the excitation signal for the other COS exciting coil.

11. A resolver signal processing apparatus comprising:

the resolver-to-digital converter circuit according to claim 1; and the resolver sensor including the SIN exciting coil, the COS exciting coil, and the detecting coil.

12. A resolver signal processing apparatus comprising:

the resolver-to-digital converter circuit according to claim 8; and the resolver sensor including the SIN exciting coil, the COS exciting coil, the detecting coil, the other SIN exciting coil, the other COS exciting coil, and the other detecting coil.

13. A resolver signal processing method comprising an excitation signal generation step of causing a control device included in a resolver-to-digital converter circuit that performs signal processing on a resolver sensor including a SIN exciting coil, a COS exciting coil, and a detecting coil to generate an excitation signal, which is an amplitude modulated wave for the SIN exciting coil and an excitation signal, which is an amplitude modulated wave for the COS exciting coil, wherein the resolver-to-digital converter circuit includes:

an excitation waveform generating unit configured to generate an excitation waveform for the SIN exciting coil from the excitation signal for the SIN exciting coil generated by the control device, and to generate an excitation waveform for the COS exciting coil from the excitation signal for the COS exciting coil generated by the control device; and a detecting unit configured to generate a signal indicating the angle of rotation of the resolver sensor on the basis of a detection signal outputted from the detecting coil, a control logic configured to cause the excitation waveform generating unit to execute a process of generating a PDM waveform, and the resolver signal processing method further comprises:

a waveform generation step of causing the control device to perform ΔΣ modulation to generate a PDM waveform corresponding to the excitation signal for the SIN exciting coil and a PDM waveform corresponding to the excitation signal for the COS exciting coil;

a first waveform storage step of causing the control device to store information for generating the PDM waveform corresponding to the excitation signal for the SIN exciting coil generated in the waveform generation step;

a second waveform storage step of causing the control device to store information for generating the PDM waveform corresponding to the excitation signal for the COS exciting coil generated in the waveform generation step, a step wherein the control logic generates the excitation signal for the SIN exciting coil corresponding to the PDM waveform stored in the first waveform memory, and a step wherein the control logic generates the excitation signal for the COS exciting coil corresponding to the PDM waveform stored in the second waveform memory.

14. A resolver signal processing apparatus comprising:

the resolver-to-digital converter circuit according to claim 8; and the resolver sensor including the SIN exciting coil, the COS exciting coil, and the detecting coil.

* * * * *